United States Patent
Gadgil et al.

(10) Patent No.: US 10,471,384 B2
(45) Date of Patent: Nov. 12, 2019

(54) SYSTEM AND METHOD FOR REDUCING HALOGEN LEVELS NECESSARY FOR MERCURY CONTROL, INCREASING THE SERVICE LIFE AND/OR CATALYTIC ACTIVITY OF AN SCR CATALYST AND/OR CONTROL OF MULTIPLE EMISSIONS

(71) Applicant: Babcock & Wilcox Power Generation Group, Inc., Barberton, OH (US)

(72) Inventors: Mandar R Gadgil, Akron, OH (US); Bryan J Jankura, Uniontown, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 423 days.

(21) Appl. No.: 13/962,761

(22) Filed: Aug. 8, 2013

(65) Prior Publication Data

US 2013/0334466 A1 Dec. 19, 2013

Related U.S. Application Data

(63) Continuation-in-part of application No. 13/769,686, filed on Feb. 18, 2013, now Pat. No. 10,213,738,
(Continued)

(51) Int. Cl.
*B01D 53/64* (2006.01)
*B01D 53/86* (2006.01)
(Continued)

(52) U.S. Cl.
CPC .......... *B01D 53/64* (2013.01); *B01D 53/46* (2013.01); *B01D 53/8659* (2013.01); *B01J 33/00* (2013.01)

(58) Field of Classification Search
CPC ..... B01D 53/8659; B01D 53/46; B01D 53/64
See application file for complete search history.

(56) References Cited

U.S. PATENT DOCUMENTS 4,061,716 A 12/1977 McGauley
4,572,085 A 2/1986 Hepworth
(Continued)

FOREIGN PATENT DOCUMENTS

CN 101687173 A 3/2010
CN 102458615 A 5/2012
(Continued)

OTHER PUBLICATIONS

Shadman et al(Aluminosilicate sorbents for control of Alkali Vapors during Coal Combustion and Gasification, Energy and Fuels (1988), 2, 702-708).*
(Continued)

*Primary Examiner* — Melvin C. Mayes
*Assistant Examiner* — Michael Forrest
(74) *Attorney, Agent, or Firm* — Michael J. Seymour

(57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for: (i) reducing halogen levels necessary to affect gas-phase mercury control; (ii) reducing or preventing the poisoning and/or contamination of an SCR catalyst; and/or (iii) controlling various emissions. In still another embodiment, the present invention relates to a method and apparatus for: (A) simultaneously reducing halogen levels necessary to affect gas-phase mercury control while achieving a reduction in the emission of mercury; and/or (B) reducing the amount of selenium contained in and/or emitted by one or more pieces of emission control equipment for boilers, heaters, kilns, or other flue gas-, or combustion gas-, generating devices (e.g., those located at power plants, processing plants, etc.).

37 Claims, 2 Drawing Sheets

Related U.S. Application Data which is a continuation-in-part of application No. 13/117,332, filed on May 27, 2011, now Pat. No. 8,691,719, which is a continuation-in-part of application No. 12/691,527, filed on Jan. 21, 2010, now Pat. No. 8,716,169.

(60) Provisional application No. 61/171,619, filed on Apr. 22, 2009.

(51) Int. Cl.
*B01D 53/46* (2006.01)
*B01J 33/00* (2006.01)

(56) References Cited

U.S. PATENT DOCUMENTS

| | | | |
|---|---|---|---|
| 4,831,942 A | 5/1989 | Morimoto et al. | |
| 4,843,980 A | 7/1989 | Markham et al. | |
| 4,871,522 A | 10/1989 | Doyle | |
| 4,925,633 A | 5/1990 | Doyle | |
| 5,540,897 A | 7/1996 | Chu et al. | |
| 5,567,394 A | 10/1996 | Chu et al. | |
| 5,585,081 A | 12/1996 | Chu et al. | |
| 5,899,679 A | 5/1999 | Euzen et al. | |
| 6,960,329 B2 | 11/2005 | Sellakumar | |
| 7,741,239 B2 | 6/2010 | Hartenstein et al. | |
| 7,998,898 B2 | 8/2011 | Gadkarec et al. | |
| 8,124,036 B1* | 2/2012 | Baldrey | C01G 13/04 423/107 |
| 8,303,919 B2 | 11/2012 | Gadgil et al. | |
| 8,372,362 B2 | 2/2013 | Durham et al. | |
| 8,496,894 B2 | 7/2013 | Durham et al. | |
| 8,741,243 B2 | 6/2014 | Gadkarec et al. | |
| 10,213,738 B2 | 2/2019 | Gadgil et al. | |
| 2005/0147549 A1* | 7/2005 | Lissianski | B01D 53/56 423/210 |
| 2006/0245993 A1 | 11/2006 | Magumbe et al. | |
| 2007/0140940 A1 | 6/2007 | Varma et al. | |
| 2007/0154374 A1 | 7/2007 | Johnson et al. | |
| 2007/0160517 A1 | 7/2007 | Fan et al. | |
| 2008/0107579 A1 | 5/2008 | Downs et al. | |
| 2008/0159948 A1 | 7/2008 | Sesing et al. | |
| 2009/0065414 A1 | 3/2009 | Nelson et al. | |
| 2010/0273643 A1 | 10/2010 | Gadgil et al. | |
| 2010/0284872 A1 | 11/2010 | Gale et al. | |
| 2010/0317749 A1 | 12/2010 | Kukkonen et al. | |
| 2011/0083367 A1 | 4/2011 | Tetzlaff | |
| 2011/0104575 A1 | 5/2011 | Mui et al. | |
| 2012/0051991 A1 | 3/2012 | Gadkarec et al. | |
| 2013/0156667 A1 | 6/2013 | Gadgil et al. | |

FOREIGN PATENT DOCUMENTS

| | | |
|---|---|---|
| CN | 102527230 A | 7/2012 |
| CN | 102698753 A | 10/2012 |
| CN | 102883794 A | 1/2013 |
| WO | 2008143831 A2 | 11/2008 |
| WO | 2010129743 A1 | 11/2010 |

OTHER PUBLICATIONS

J.P. Chen et al.; Mechanism of Poisoning of the V2O5/TiO2 Catalyst for the Reduction of NO by NH3; Journal of Catalysis, vol. 125, pp. 411 to 420 (Oct. 1990).

Vitali V. Lissianski et al.; Utilization of Iron Additives for Advanced Control of NOx Emissions from Stationary Combustion Sources; Ind. Eng. Chem. Res. 2001 (published on the Internet on Jun. 22, 2001), 40, pp. 3287 to 3293.

Terence Ake et al.; Limestone Injection for Protection of SCR Catalyst; Riley Power, Duke Energy, Cormetech, Inc. Paper #175, 2003.

Beck Jens et al.; The Behavior of Particle Bound Phosphorus During the Combustion of Phosphate Doped Coal; Fuel, 86, 2007 (available online Sep. 27, 2006), pp. 632 to 640.

Virpi Kroger; Poisoning of Automotive Exhaust Gas Catalyst Components—The Role of Phosphorus in the Poisoning Phenomena; Academic Dissertation, University of Oulu, Finland—2007.

Elias Matinde et al.; Phosphorus Gasification from Sewage Sludge During Carbothermic Reduction; ISIJ International, vol. 48 (2008), No. 7, pp. 912 to 917.

Athen Tate et al.; Environmentally Sound Handling of Deactivated SCR Catalyst; Downloaded from the Internet on May 13, 2009 at http://www.coalpowermag.com/environmenta1/136.html.

Xiaoyu Guo et al.; Effects of sulfate species on V2O5/TiO2 Scr Catalysts in Coal and Biomass-fired Systems; Applied catalysis B: Environmental, vol. 92, pp. 30 to 40 (Oct. 2009).

PCT International Search Report dated Aug. 17, 2012 in corresponding PCT application No. PCT/US2012/039175.

Auzmendi-Murua et al.; Gas Phase Mercury Oxidation by Halogens (Cl, Br, I) in Combustion Effluents: Influence of Operating COnditions; Energy & Fuels, vol. 60, pp. 603 to 615 (2016).

Chinese Office Action dated Oct. 31, 2016 in Chinese Patent Application No. 201480037359.4.

Chinese Office Action dated Jul. 4, 2017 in Chinese Patent Application No. 201480037359.4.

Chinese Office Action dated Jan. 12, 2018 in Chinese Patent Application No. 201480037359.4.

European Search Report and Opinion dated Mar. 3, 2017 in European Patent Application No. 14840180.5.

European Office Action dated May 21, 2019 in European Patent Application No. 14840180.5.

Indian Office Action dated Apr. 23, 2019 in Indian Patent Application No. 4022/KOLNP/2015.

* cited by examiner

SYSTEM AND METHOD FOR REDUCING HALOGEN LEVELS NECESSARY FOR MERCURY CONTROL, INCREASING THE SERVICE LIFE AND/OR CATALYTIC ACTIVITY OF AN SCR CATALYST AND/OR CONTROL OF MULTIPLE EMISSIONS

RELATED APPLICATION DATA

This patent application claims priority to and is a continuation-in-part of U.S. patent application Ser. No. 13/769,686 filed Feb. 18, 2013 and titled "System and Method for Increasing the Service Life and/or Catalytic Activity of an SCR Catalyst and Control of Multiple Emissions," now U.S. Pat. No. 10,213,738, which itself claims priority to and is a continuation-in-part of U.S. patent application Ser. No. 13/117,332 filed May 27, 2011 and titled "System and Method for Increasing the Service Life and/or Catalytic Activity of an SCR Catalyst and Control of Multiple Emissions," now U.S. Pat. No. 8,691,719, which itself claims priority to and is a continuation-in-part of U.S. patent application Ser. No. 12/591,527 filed Jan. 21, 2010 and titled "System and Method for Protection of SCR Catalyst and Control of Multiple Emissions," now U.S. Pat. No. 8,716,169, which itself claims priority to and is a non-provisional of U.S. Provisional Patent Application No. 61/171,619 filed Apr. 22, 2009 and titled "System and Method for Protection of SCR Catalyst." The complete text of these patent applications are hereby incorporated by reference as though fully set forth herein in their entireties.

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for: (i) reducing halogen levels necessary to affect gas-phase mercury control; (ii) reducing or preventing the poisoning and/or contamination of an SCR catalyst; and/or (iii) controlling various emissions. In another embodiment, the method and apparatus of the present invention is designed to: (a) achieve a reduction in the level of one or more halogens, or halogen-containing compounds, necessary to affect gas-phase mercury control; (ii) achieve protection of, increase the catalytic activity, and/or increase the catalytic life span of an SCR catalyst; and/or (iii) achieve control of various emissions from a combustion process (e.g., control of selenium emissions). In still another embodiment, the present invention relates to a method and apparatus for: (A) simultaneously reducing halogen levels necessary to affect gas-phase mercury control while achieving a reduction in the emission of mercury; and/or (B) reducing the amount of selenium contained in and/or emitted by one or more pieces of emission control equipment for boilers, heaters, kilns, or other flue gas-, or combustion gas-, generating devices (e.g., those located at power plants, processing plants, etc.).

2. Description of the Related Art $NO_x$ refers to the cumulative emissions of nitric oxide (NO), nitrogen dioxide ($NO_2$) and trace quantities of other nitrogen oxide species generated during combustion. Combustion of any fossil fuel generates some level of $NO_x$ due to high temperatures and the availability of oxygen and nitrogen from both the air and fuel. $NO_x$ emissions may be controlled using low $NO_x$ combustion technology and post-combustion techniques. One such post-combustion technique involves selective catalytic reduction (SCR) systems in which a catalyst facilitates a chemical reaction between $NO_x$ and a reagent (usually ammonia) to produce molecular nitrogen and water vapor.

SCR technology is used worldwide to control $NO_x$ emissions from combustion sources. This technology has been used widely in Japan for $NO_x$ control from utility boilers since the late 1970's, in Germany since the late 1980's, and in the US since the 1990's. Industrial scale SCRs have been designed to operate principally in the temperature range of 500° F. to 900° F., but most often in the range of 550° F. to 750° F. SCRs are typically designed to meet a specified $NO_x$ reduction efficiency at a maximum allowable ammonia slip. Ammonia slip is the concentration, expressed in parts per million by volume, of unreacted ammonia exiting the SCR.

For additional details concerning NO removal technologies used in the industrial and power generation industries, the reader is referred to *Steam/its generation and use,* 41$^{st}$ Edition, Kitto and Stultz, Eds., Copyright 2005, The Babcock & Wilcox Company, Barberton, Ohio, U.S.A., particularly Chapter 34—Nitrogen Oxides Control, the complete text of which is hereby incorporated by reference as though fully set forth herein.

Regulations issued by the EPA promise to increase the portion of utility boilers equipped with SCRs. SCRs are generally designed for a maximum efficiency of about 90 percent. This limit is not set by any theoretical limits on the capability of SCRs to achieve higher levels of NO destruction. Rather, it is a practical limit set to prevent excessive levels of ammonia slip. This problem is explained as follows.

In an SCR, ammonia reacts with NO according to one or more of the following stoichiometric reactions (a) to (d):

$$4NO+4NH_3+O_2 \rightarrow 4N_2+6H_2O \quad (a)$$

$$12NO_2+12NH_3 \rightarrow 12N_2+18H_2O+3O_2 \quad (b)$$

$$2NO_2+4NH_3+O_2 \rightarrow 3N_2+6H_2O \quad (c)$$

$$NO+NO_2+2NH_3 \rightarrow 2N_2+3H_2O \quad (d).$$

The above catalysis reactions occur using a suitable catalyst. Suitable catalysts are discussed in, for example, U.S. Pat. Nos. 5,540,897; 5,567,394; and 5,585,081 to Chu et al., all of which are hereby incorporated by reference as though fully set forth herein. Catalyst formulations generally fall into one of three categories: base metal, zeolite and precious metal.

Base metal catalysts use titanium oxide with small amounts of vanadium, molybdenum, tungsten or a combination of several other active chemical agents. The base metal catalysts are selective and operate in the specified temperature range. The major drawback of the base metal catalyst is its potential to oxidize $SO_2$ to $SO_3$; the degree of oxidation varies based on catalyst chemical formulation. The quantities of $SO_3$ which are formed can react with the ammonia carryover to form various ammonium-sulfate salts.

Zeolite catalysts are aluminosilicate materials which function similarly to base metal catalysts. One potential advantage of zeolite catalysts is their higher operating temperature of about 970° F. (521° C.). These catalysts can also oxidize $SO_2$ to $SO_3$ and must be carefully matched to the flue gas conditions.

Precious metal catalysts are generally manufactured from platinum and rhodium. Precious metal catalysts also require careful consideration of flue gas constituents and operating temperatures. While effective in reducing $NO_x$, these catalysts can also act as oxidizing catalysts, converting CO to $CO_2$ under proper temperature conditions. However, $SO_2$ oxidation to $SO_3$ and high material costs often make precious metal catalysts less attractive.

As is known to those of skill in the art, various SCR catalysts undergo poisoning when they become contaminated by various compounds including, but not limited to, certain phosphorus compounds such as phosphorus oxide (PO) or phosphorus pentoxide ($P_2O_5$). Additionally, it is also well known that SCR catalysts degrade over time and have to be replaced periodically at a significant cost and loss of generating capacity. In a typical 100 MWe coal plant the downtime and cost associated with the replacement of underperforming catalyst can be in the neighborhood of one million US dollars or more.

More particularly, as the SCR catalysts are exposed to the dust laden flue gas there are numerous mechanisms including blinding, masking and poisoning that deactivates the catalyst and causes a decrease in the catalyst's performance over time. The most common catalyst poison encountered when burning eastern domestic coal (i.e., coal mined in the eastern United States) is arsenic. The most common catalyst poison encountered when burning western domestic coal (i.e., coal mined in the western United States) is phosphorus and calcium sulfate is the most common masking mechanism. One method of recycling the used catalyst is the process called regeneration washing or rejuvenation. The initial steps of the regeneration process involve the removal of these toxic chemicals by processing the catalysts through various chemical baths in which the poisons are soluble. While this treatment process does an excellent job of removing the desired poisons it produces wastewater with very high arsenic concentrations.

In another situation, Powder River Basin/Lignite coal plants, any coal/biomass co-combustion, or any coal/bone meal co-combustion or even pure biomass combustion power plants will suffer from phosphorus contamination of their SCR catalysts.

Additionally, beyond controlling $NO_x$ emissions, other emission controls must be considered and/or met in order to comply with various state, EPA and/or Clean Air Act regulations. Some other emission controls which need to be considered for boilers, heaters, kilns, or other flue gas-, or combustion gas-, generating devices (e.g., those located at power plants, processing plants, etc.) include, but are not limited to, mercury, $SO_x$, and certain particulates.

Furthermore, in most situations, if not all, it is desirable to remove various $SO_x$ compounds by way of either one or more wet flue gas desulfurization (WFGD) units or one or more dry flue gas desulfurization (DFGD) units from a flue gas. As is known to those of skill in the art, in conjunction with $SO_x$ removal it is common (and now required in most instances) to also remove and/or reduce the amount of mercury in a flue gas. One suitable method of mercury control is mercury oxidation and capture via the use of one or more halogen compounds to accomplish the aforesaid mercury oxidation and the subsequently capturing the oxidized mercury compound (e.g., in the form of a mercuric halide). It has been found that when mercury control is accomplished in whole, or in part, through the use of one or more halogen compounds (e.g., halide salts such as calcium bromide, etc.) that such compounds negatively impact on the selenium speciation in the flue gas which in turn negatively impacts the amount of selenium that is emitted via the liquid effluent outflow from one or more WFGD units, and or the particulate matter produced by one or more DFGD units that are utilized to control $SO_x$ in the same flue gas stream. However, it should be noted that the present invention is not limited to just the aforementioned situation. In fact, in one embodiment the present invention relates to a method and apparatus for controlling, mitigating and/or reducing the amount of selenium contained in and/or emitted by one or more pieces of emission control equipment for boilers, heaters, kilns, or other flue gas-, or combustion gas-, generating devices (e.g., those located at power plants, processing plants, etc.). In another embodiment, the present invention relates to method and apparatus for controlling the selenium speciation in one, or both, of a gas phase or a aqueous phase by the addition of at least one metal additive at any point upstream (as will be detailed below) of either a wet flue gas desulfurization (WFGD) unit and/or a dry flue gas desulfurization (DFGD) unit. In still another embodiment, present invention offers a method and apparatus by which to simultaneously control at least selenium speciation in one, or both, of a gas phase or an aqueous phase while further controlling at least one of gas phase phosphorus, gas phase sodium, gas phase potassium, and/or mercury in at least one emission from a combustion process.

In, for example, a coal combustion process the addition of one or more halogens, or halogen-containing compounds, (e.g., calcium bromide, or any other suitable bromine-containing compound) forms one or more corresponding gaseous hydrogen halide compounds (e.g., HBr, HCl, HF, and/or HI). Hydrogen halide gases including, but not limited to, HBr gas are not very reactive towards mercury and cause both high temperature corrosion under reducing atmosphere in a furnace and low temperature corrosion at an air heater outlet. For example, HBr is converted to Br and $Br_2$ gas by the Deacon reaction shown below:

$$4HBr(g)+O_2(g) \rightarrow 2H_2O(g)+2Br_2 \qquad (g).$$

$Br_2$, or another elemental form of a different halogen, in the gas phase then reacts with Hg in the gas phase to produce, for example, mercuric bromide ($HgBr_2$) in the gas phase. Mercuric bromide is the compound in this example that contains the oxidized mercury. This form of mercury is easily removed using flue gas desulfurization (FGD) equipment. Additionally, other coal-based process such as the production of syngas from coal produce undesirable levels of phosphorus compounds thereby resulting in the undesirable deactivation of one or more catalysts associated with such production processes.

Given the above, a need exists for a method that provides for any economical and environmentally suitable method and/or system that permits: (i) a reduction in the halogen levels necessary to affect gas-phase mercury control; (ii) a reduction in, or prevention of, the poisoning and/or contamination of an SCR catalyst; and/or (iii) the control of various emissions. In another instance, there exists a need to control selenium emission from one or more pieces of emission control equipment that are used in conjunction with a combustion process. Additionally, or alternatively, a need exists for a method to control selenium emission while simultaneously increase catalytic life span and/or catalytic activity of an SCR catalyst via the control of one or more gas phase compounds such as phosphorus, sodium, and/or potassium, and even in some instances the further ability to control mercury emission.

SUMMARY OF THE INVENTION

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for: (i) reducing halogen levels necessary to affect gas-phase mercury control; (ii) reducing or preventing the poisoning and/or contamination of an SCR catalyst; and/or (iii) controlling various emissions. In another embodiment, the method and apparatus of the present invention is designed to: (a) achieve a reduction in the level of one or more halogens, or halogen-containing compounds, necessary to affect gas-phase mercury control; (ii) achieve protection of, increase the catalytic activity, and/or increase the catalytic life span of an SCR catalyst; and/or (iii) achieve control of various emissions from a combustion process (e.g., control of selenium emissions). In still another embodiment, the present invention relates to a method and apparatus for: (A) simultaneously reducing halogen levels necessary to affect gas-phase mercury control while achieving a reduction in the emission of mercury; and/or (B) reducing the amount of selenium contained in and/or emitted by one or more pieces of emission control equipment for boilers, heaters, kilns, or other flue gas-, or combustion gas-, generating devices (e.g., those located at power plants, processing plants, etc.).

Accordingly, one aspect of the present invention is drawn to a method for reducing the amount and/or concentration of one or more halogen-containing compounds used to achieve mercury capture in a flue gas, the method comprising the steps of: (a) providing one or more halogen-containing compounds to a combustion zone or flue gas stream of a furnace, or boiler, prior to entry of the flue gas into an SCR, wherein the halogen portion of the one or more halogen-containing compounds are liberated in the combustion zone or flue gas stream of the furnace or boiler and are converted to one or more corresponding gaseous hydrogen halide compounds; (b) providing one or more metal-bearing compounds to a combustion zone or flue gas stream of a furnace, or boiler, at a point that is both prior to entry of the flue gas into an SCR as well as after a point that where the majority of the one or more halogen-bearing compounds have been converted to the corresponding gaseous hydrogen halides; (c) permitting one or more metal-bearing compounds to catalyze the conversion of the corresponding one or more hydrogen halides to one or more corresponding elemental halogen compounds; and (d) permitting the resulting one or more corresponding elemental halogen compounds to react with gaseous mercury present in the combustion zone or flue gas stream of the furnace, or boiler, thereby resulting in oxidation of the gaseous mercury so as to convert the gaseous mercury into one or more corresponding mercury halides.

In yet another aspect of the present invention, there is provided a method for reducing the amount and/or concentration of one or more gaseous acid compounds in a flue gas, the method comprising the steps of: (i) providing at least one fossil fuel, or biomass, to a furnace, or boiler; (ii) combusting the at least one fossil fuel, or biomass, wherein the combustion process produces one or more gaseous acid compounds; (iii) providing one or more metal-bearing compounds to a combustion zone or flue gas stream of the furnace, or boiler; (iv) permitting one or more metal-bearing compounds to react with the one or more gaseous acid compounds present in the combustion, or flue, gas in order to convert the one or more gaseous acid compounds into a less acidic metal-containing compound.

In yet another aspect of the present invention, there is provided a method for reducing the concentration of one or more gaseous phosphorus compounds in a syngas production process, the method comprising the steps of: (A) providing at least one fossil fuel, or biomass, to a syngas reactor; (B) providing one or more metal-bearing compounds to the syngas reactor; (C) reacting the at least one fossil fuel, or biomass, and the one or more metal-bearing compounds to produce a syngas, wherein the syngas has a reduced level of one or more one or more gaseous phosphorus compounds as compared to the amount and/or concentration of one or more gaseous phosphorus compounds present in a syngas production process that does not utilize the one or more metal-bearing compounds.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
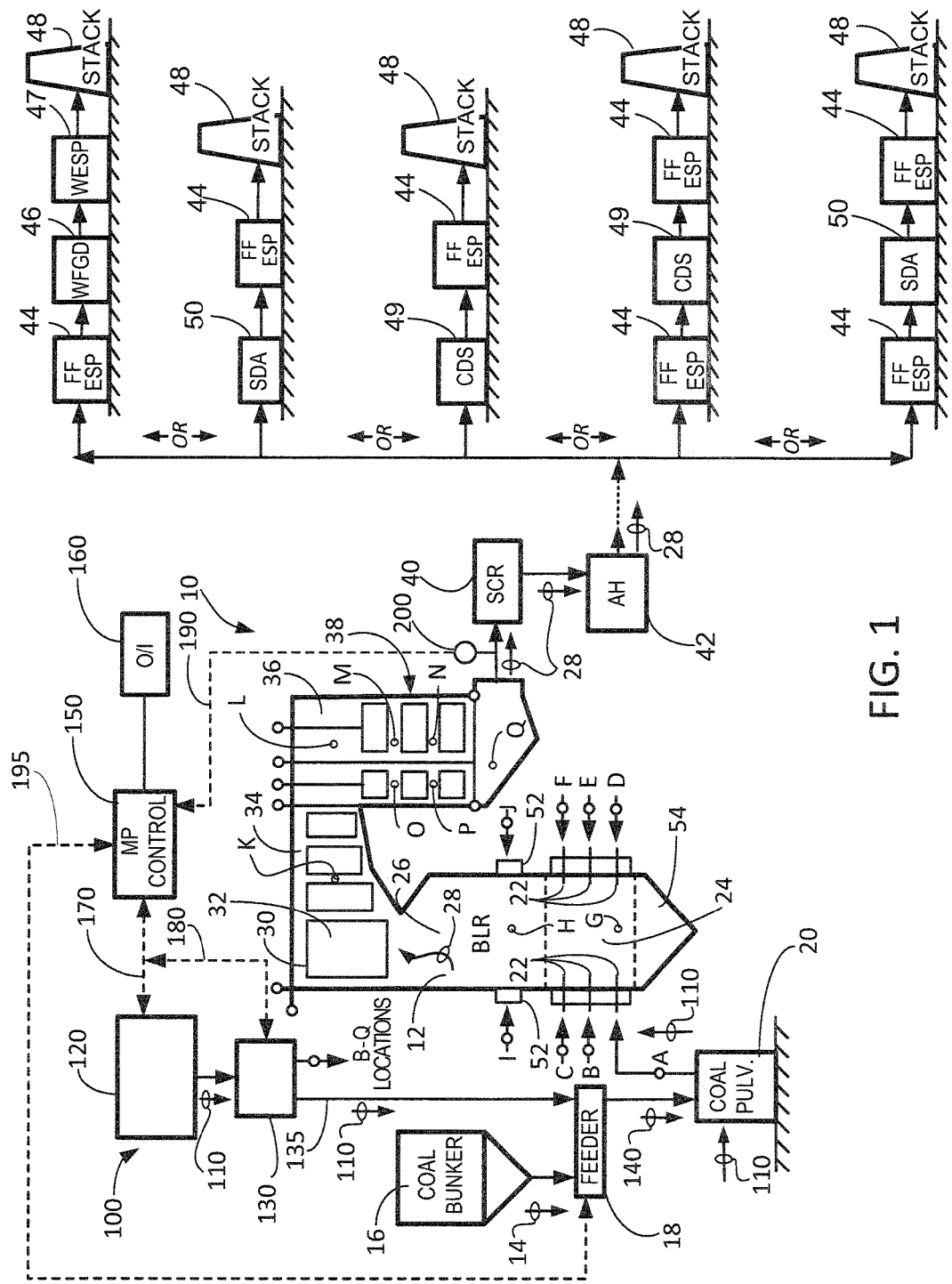
FIG. 1 is a schematic representation of a typical fossil fuel burning facility with an SCR system, and which includes a system for practicing the methods of the present invention.

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for: (i) reducing halogen levels necessary to affect gas-phase mercury control; (ii) reducing or preventing the poisoning and/or contamination of an SCR catalyst; and/or (iii) controlling various emissions. In another embodiment, the method and apparatus of the present invention is designed to: (a) achieve a reduction in the level of one or more halogens, or halogen-containing compounds, necessary to affect gas-phase mercury control; (ii) achieve protection of, increase the catalytic activity, and/or increase the catalytic life span of an SCR catalyst; and/or (iii) achieve control of various emissions from a combustion process (e.g., control of selenium emissions). In still another embodiment, the present invention relates to a method and apparatus for: (A) simultaneously reducing halogen levels necessary to affect gas-phase mercury control while achieving a reduction in the emission of mercury; and/or (B) reducing the amount of selenium contained in and/or emitted by one or more pieces of emission control equipment for boilers, heaters, kilns, or other flue gas-, or combustion gas-, generating devices (e.g., those located at power plants, processing plants, etc.).

As used herein, "majority" means any amount in excess of 50 weight percent. Also as used herein, "less acidic metal-containing compound" means any metal-containing compound that contains at least one non-hydrogen portion of an acid compound (e.g., HBr, HCl, HF, HI, $H_3PO_4$, etc.) and has a pH less than that of such related acid compound such.

While the present invention will be described in terms of SCR systems which use ammonia as the $NO_x$ reducing agent, since ammonia is frequently preferred for economic reasons, the present invention is not limited to ammonia based systems. The concepts of the present invention can be used in any system which uses an ammoniacal compound. As used in the present disclosure, an ammoniacal compound is a term meant to include compounds such as urea, ammonium sulfate, cyanuric acid, and organic amines as well as ammonia ($NH_3$). These compounds could be used as reducing agents in addition to ammonia, but as mentioned above, ammonia is frequently preferred for economic reasons. Some non-ammoniacal compounds such as carbon monoxide or methane can be used as well, but with loss in effectiveness.

Furthermore, although the present invention is described in terms of a mercury oxidation and capture method that utilizes a halogen compound that is in the form a halide salt (e.g., calcium bromide), the present invention is not limited to just this type of mercury oxidation and capture. Rather, any type of halogen-based mercury control method can be utilized in conjunction with the present invention as the present invention. In some embodiments, the present invention as the present invention also seeks to control simultaneously one or more of the amount and/or concentration of: (i) gas phase phosphorus and/or (ii) the nature, or type, of the selenium speciation. In other embodiments, the present invention seeks to control simultaneously the amount and/or concentration of gas phase phosphorus, the amount and/or concentration of one or more halogen compounds necessary for mercury control, and/or and the nature of the selenium speciation in a flue gas.

Although the present invention is described in relation to a boiler, or a fossil fuel boiler, it is not limited solely thereto. Instead, the present invention can be applied to any combustion source that generates $NO_x$ regardless of whether such a combustion source is utilized in conjunction with a boiler, or a steam generator. For example, the present invention could be used in combination with a kiln, a heater, or any other type of combustion process that generates, in whole or in part, a flue gas or combustion gas containing $NO_x$. Accordingly, the description below is to be construed as merely exemplary.

As illustrated in FIG. 1, the present invention may be applied to a boiler installation which employs a wet flue gas desulfurization (WFGD or wet scrubber) for removal of sulfur oxides from the flue gases, as shown in the upper right-hand side of FIG. 1. In this configuration, the wet scrubber is typically preceded (with respect to a direction of flue gas flow through the system) by a particulate collection device (PCD), advantageously a fabric filter (FF) bag house, or an electrostatic precipitator (ESP). If desired, there may also be provided a wet electrostatic precipitator (wet ESP or WESP) which may be provided as a final "polishing" stage for fine particulate or $SO_3$. Alternatively, the present invention may be applied to a system which employs a spray dryer apparatus (SDA) or dry scrubber for removal of sulfur oxides from the flue gases, as shown in the lower right-hand side of FIG. 1. In this configuration, the SDA or dry scrubber is typically followed (with respect to a direction of flue gas flow through the system) by a particulate collection device (PCD), advantageously a fabric filter (FF) or baghouse, an electrostatic precipitator (ESP) or even a wet electrostatic precipitator (wet ESP).

Additionally, the present invention can be applied to any SCR catalyst that is adversely affected by poisoning with a phosphorus-based compound such as, but not limited to, $H_3PO_4$, PO or $P_2O_5$. As such, the present invention is not limited to any one type of SCR catalyst, but rather is broadly applicable to a wide range of SCR catalyst systems. Suitable catalyst systems for which the present invention is applicable include, but are not limited to, honeycomb, plate or corrugated type configurations.

In one embodiment, the present invention is directed to reducing the rate of SCR catalyst deactivation on Powder River Basin (PRB) coal combustion units. It should be noted that although the present invention is described in relation to PRB coal, the present invention is not limited thereto. Rather, the present invention is broadly applicable to any situation where an SCR catalyst is poisoned by one or more gaseous phosphorus compounds.

In one embodiment, phosphorus in PRB coal is suspected to cause rapid deactivation in staged combustion and other units. This deactivation is suspected to be caused by the gas phase phosphorus released via carbothermic reduction reaction. In this reaction under oxygen deficient conditions, phosphorus bearing compounds release gas phase phosphorus by the following reaction:

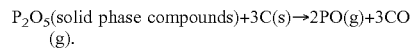

$$P_2O_5(\text{solid phase compounds}) + 3C(s) \rightarrow 2PO(g) + 3CO(g).$$

This gas phase phosphorus attaches to the active sites within the catalyst causing the deactivation of the sites for $NO_x$ reduction. As a result of this deactivation the SCR catalyst cannot carry out the $NO_x$ reduction process to the same performance level as unused catalyst.

In one embodiment, the present invention relates to a system and method to prevent formation of gas phase phosphorus species in the combustion environment thus reducing, mitigating and/or eliminating the rate of SCR deactivation. In one embodiment, the present invention accomplishes the aforementioned goal by the addition of at least one iron-bearing compound to the PRB coal prior to combustion.

In another embodiment, the present invention is directed to a system and method designed to increase the catalytic activity and/or catalytic life span. In this case, the increase in catalytic activity and/or increase in catalytic life span is measured against a standard, or known, rate of decline in catalytic activity and/or life for a given a boiler, fossil fuel boiler, kiln, heater, or any other type of device that generates a flue gas or combustion gas containing $NO_x$.

In one embodiment, the iron-bearing compounds of the present invention is any iron compound (e.g., an iron oxide compound) that is able to undergo reduction in the combustion environments common to boilers, furnaces, power plants, etc. In another embodiment, the iron-bearing compound of the present invention can be a water soluble, or water insoluble, iron-bearing compound. Suitable water soluble iron-bearing inorganic compounds include, but are not limited to, iron (II) acetate (e.g., $Fe(C_2H_3O_2)_2 \cdot 4H_2O$), iron (II) nitrate (e.g., $Fe(NO_3)_2 \cdot 6H_2O$), iron (III) nitrate (e.g., $Fe(NO_3)_3 \cdot 6H_2O$ or $Fe(NO_3)_3 \cdot 9H_2O$), iron (II) sulfate (e.g., $FeSO_4 \cdot H_2O$, $FeSO_4 \cdot 4H_2O$, $FeSO_4 \cdot 5H_2O$, or $FeSO_4 \cdot 7H_2O$), iron (III) sulfate (e.g., $Fe_2(SO_4)_3 \cdot 9H_2O$), or mixtures of two or more thereof. Although various hydrated forms of iron-bearing compounds are listed here, the present invention is not limited to just the hydrated forms listed above. Rather, if possible, any corresponding anhydrous form of the above listed iron-bearing compounds can also be utilized in conjunction with the present invention. Given this, when an iron-bearing compound is mentioned herein it should be interpreted to encompass both a hydrated form or an anhydrous form regardless of whether or not such a formula is given with "bound water." Suitable water insoluble iron-bearing compounds include but are not limited to, metallic iron, one or more iron oxides, iron carbonate, or mixtures of two or more thereof. Additionally, a wide range of water soluble, or water insoluble, organic iron bearing compounds could be utilized in conjunction with the present invention. As will be discussed below, the iron-bearing compound of the present invention can be supplied in any desirable form including, but not limited to, powderized form, solid form, as an aqueous solution, as an aqueous suspension or emulsion, or any combination of two or more different forms of iron-bearing compounds. In still another embodiment, where two different forms of iron-bearing compounds are supplied in conjunction with the present invention, the iron-bearing compound supplied via each different form can be the same or different. In one particular embodiment, the iron-bearing compound is iron (III) oxide ($Fe_2O_3$), also known as red iron oxide or hematite. In the embodiment where iron (III) oxide is utilized the reactions of interest that occur in the combustion portion of a boiler or furnace are as shown below:

$$3Fe_2O_3(s) + CO(g) \rightarrow 2Fe_3O_4(s) + CO_2(g) \quad (1)$$

$$Fe_3O_4(s) + CO(g) \rightarrow 3FeO(s) + CO_2(g) \quad (2).$$

It should be noted that the $Fe_3O_4$, also known as black iron oxide or magnetite, of the first reaction above can also be written more accurately as $FeO.Fe_2O_3$. The FeO or iron (II) oxide, also known as ferrous oxide, which is generated due to the reduction of $Fe_2O_3$ is then available to tie-up, bind and/or sequester any PO gas present in the combustion zone, or the flue gas, of a boiler, or furnace, prior to arrival at the SCR. This PO gas will then form Fe—P compounds in particulate phase prior to arrival at the SCR. The particulate will pass through the catalyst and avoid the catalyst deterioration.

In another embodiment, the present invention can utilize iron (II) carbonate which is converted to the desired iron (II) oxide in the combustion zone via the reaction shown below:

$$FeCO_3(s) \rightarrow FeO(s) + CO_2(g) \quad (3).$$

In still another embodiment, the present invention can utilize a combination of one or more iron-containing compounds and one or more halide compounds, with the proviso that the halide containing compound is not an iron halide. Thus, in this embodiment at least one iron-containing compound is utilized in conjunction with at least one non-iron halide containing compound. In still another embodiment, the at least one iron compound has a generic formula of AX, where A is equal to iron and X is either an oxide or carbonate ion, anion, group, and/or moiety and the at least one halide compound has a generic formula of BY where B is any atom, element, or cation except for iron and Y is a halide selected from chlorine, bromine, fluorine, or iodine.

In one embodiment, suitable halides for use in conjunction with the present invention include, but are not limited to, potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, other metal halides (e.g., bromides, chlorides, fluorides and/or iodides) with the proviso that the metal is not iron, or any mixture of two or more thereof. In still another embodiment, any one or more halide compounds in accordance with the proviso defined above can be used in combination with one or more non-halide containing iron compounds (e.g., iron (II) carbonate). In still another embodiment, the present invention utilizes a combination of iron (II) carbonate with calcium bromide to control the amount and/or concentration of phosphorus in a flue gas, or combustion gas while concurrently permitting both the control of mercury compounds, or mercury-containing compounds, in a flue gas, or combustion gas and the increase in catalytic activity and/or service life. In still yet another embodiment, the present invention utilizes a combination of iron (II) carbonate with calcium chloride to control the amount and/or concentration of phosphorus in a flue gas, or combustion gas while concurrently permitting both the control of mercury compounds, or mercury-containing compounds, in a flue gas, or combustion gas and the increase in catalytic activity and/or service life. In still yet another embodiment, the present invention utilizes a combination of iron (II) carbonate with either one, or both, of aluminum bromide and/or aluminum chloride to control the amount and/or concentration of phosphorus in a flue gas, or combustion gas while concurrently permitting both the control of mercury compounds, or mercury-containing compounds, in a flue gas, or combustion gas and the increase in catalytic activity and/or service life. As used herein, mercury compounds, or mercury-containing compounds, include, but are not limited to, any compound that contains either oxidized mercury, or bound elemental mercury. In still another embodiment, the present invention is directed to concurrently permitting the control of mercury compounds, or mercury-containing compounds, that contain primarily, or only, oxidized mercury.

As used herein, any iron compound suitable for use in conjunction with the present invention can be utilized in a hydrated or non-hydrated form. As such, reference to any iron compound herein by definition includes any hydrated forms that exists whether or not specifically mentioned by chemical formula.

As is known in the art, (see, e.g., United States Patent Application Publication No. 2008/0107579 the text of which is hereby incorporated by reference as though fully set forth herein) halide-containing compounds are utilized to oxidize elemental mercury present in a flue, or combustion, gas. Due to this oxidation reaction, the halide portion of a suitable halide-containing compound permits elemental mercury to be converted into a more favorable form for subsequent capture, or sequestration, via one or more suitable environmental control technologies (e.g., a wet scrubber or spray dry absorber (SDA), a flue gas desulfurization system (FGD), a powdered activated carbon system (PAC), or a particulate collecting system such as a fabric filter (FF) or a electrostatic precipitator (ESP)). In one instance, as is known in the art, the addition of one or more suitable halide-containing compounds also increases the amount of mercury that is particulate-bound. Given that numerous patents and published applications detail the manner by which suitable halide-containing compounds permit the increased recovery of mercury from a flue, or combustion, gas, a detailed discussion hereof is omitted for the sake of brevity.

In any of the above embodiments, the suitable one or more iron-bearing compounds, and if so desired the one or more halide compounds, can be added to the coal via one or more pulverizers. In still another embodiment, the one or more iron-bearing compounds, and if so desired the one or more halide compounds, of the present invention can be added to the combustion zone of a boiler and/or furnace via one or more suitable supply lines designed to deliver a powderized, solid, aqueous suspension, suspension, or aqueous solution of the one or more iron-bearing compounds and/or the one or more halide compounds to the combustion zone of a furnace and/or boiler. To this end, FIG. 1 illustrates several embodiments of suitable design schemes for accomplishing this result.

Referring to FIG. 1, there is illustrated a schematic representation of a typical fossil fuel burning facility, generally designated 10, with an SCR system, and which includes a system for practicing the methods of the present invention. As shown, boiler 12 is provided for extracting the heat from the combustion of a fossil fuel, such as coal, through combustion with an oxidant, typically air. The heat is transferred to a working fluid, such as water, to generate steam used to either generate power via expansion through a turbine generator apparatus (not shown) or for industrial processes and/or heating.

The raw coal 14 must be crushed to a desired fineness and dried to facilitate combustion. Raw coal 14 is temporarily stored in a coal bunker 16 and then transferred by means of a gravimetric or volumetric feeder 18 to one or more coal pulverizers 20. In the embodiment shown in FIG. 1, there are six (6) coal pulverizers, identified as coal pulverizers A-F. As is known to those skilled in the art, each coal pulverizer 20 grinds the coal to a desired fineness (e.g., 70 percent through 200 mesh) and as it is ground, hot primary air from primary air fans (not shown) is conveyed into each coal pulverizer 20 to preheat and remove moisture from the coal to desired levels as it is ground. The primary air is also used to convey the pulverized coal (PC) out of each coal pulverizer 20 and delivers it along a plurality of pulverized coal supply lines (one such burner line is identified at A in FIG. 1; a single coal pulverizer 20 may supply coal through 4 to 8 pulverized coal supply lines) to the burners 22 on the front and rear walls of the boiler 12. Typically, the burners 22 are located in spaced elevations on one or both of the opposed front and rear walls of the boiler 12, or at the corners of the boiler in installations known as corner-fired or tangentially-fired units (not shown). The present invention can be utilized in conjunction with, but is not limited solely to, single-wall fired, opposed-wall fired and corner- or tangentially-fired units. Typically, a single coal pulverizer 20 only provides coal to a single elevation of burners 22 on a wall. Thus, in the embodiment shown in FIG. 1, the six coal pulverizers A-F supply corresponding burner elevations A-F. However, as is known to those skilled in the art, other pulverizer and burner configurations are known (e.g., single pulverizers supplying burners on multiple walls and/or elevations or multiple pulverizers supplying burners on a single elevation) and the present invention applies to any such configurations.

The combustion process begins in the burner zone 24 of the boiler 12's furnace 26, releasing heat and creating hot flue gas 28 which is conveyed upwardly to the upper portion 30 of the boiler 12, across heating surfaces schematically indicated as rectangles 32. The flue gas 28 is then conveyed across the heating surfaces in the pendant convection pass 34, into the upper portion 36 of the horizontal convection pass 38. The flue gas 28 is then conveyed through a selective catalytic reduction (SCR) apparatus 40 where $NO_x$ in the flue gas is reduced, and then through primary and secondary air heater devices schematically indicated at 42. The air heaters 42 extract additional heat from the flue gas 28, lowering the temperature of the flue gas, and preheating the incoming air used for combustion.

As illustrated in FIG. 1, and downstream of the air heaters 42, the flue gas 28 undergoes further treatment for the removal of particulates and sulfur oxides. Two typical configurations of the downstream equipment employed to accomplish these tasks are shown on the right-hand side of FIG. 1. The first equipment configuration in FIG. 1 comprises a particulate collection device (PCD) schematically indicated at 44, for removal of particulates from the flue gas 28, and which may comprise in practice a fabric filter or an electrostatic precipitator. Downstream of the PCD 44 there is provided a wet flue gas desulfurization (WFGD) device, also known as a wet scrubber, for removal of sulfur oxides from the flue gas 28. The cleaned, scrubbed flue gas may (optionally) be conveyed through a wet ESP 47 for removal of fine particulate or $SO_3$, and then conveyed to stack 48 for discharge to the atmosphere.

The second equipment configuration in FIG. 1 comprises a spray dryer apparatus (SDA) schematically indicated at 50, also known as a dry scrubber, for removal of sulfur oxides from the flue gas 28. Downstream of the SDA 50 there is provided a particulate collection device (PCD) 44, as described above, for removal of particulates from the flue gas 28. The cleaned, scrubbed flue gas is then conveyed to stack 48 for discharge to the atmosphere.

The third equipment configuration in FIG. 1 comprises a circulating dry scrubber (CDS) schematically indicated at 49, for removal of sulfur oxides from the flue gas 28. Downstream of CDS 49 there is provided a particulate collection device (PCD) 44 for removal of particulates from the flue gas 28. As in the embodiments above, PCD 44 may comprise any suitable particulate collection device including, but not limited to, a fabric filter or an electrostatic precipitator as described above. The cleaned, scrubbed flue gas is then conveyed to stack 48 for discharge to the atmosphere.

The fourth equipment configuration in FIG. 1 comprises a first particulate removal device in the form of an electrostatic precipitator (ESP) which is schematically indicated at 44. ESP 44 is configured to remove fine particulates from flue gas 28. Downstream of ESP 44 there is provided a circulating dry scrubber (CDS) schematically indicated at 49, for removal of sulfur oxides from the flue gas 28. Downstream of CDS 49 there is provided a second particulate collection device (PCD) 44 for removal of any remaining particulates from the flue gas 28. As in the embodiments above, PCD 44 may comprise any suitable particulate collection device including, but not limited to, a fabric filter or an electrostatic precipitator as described above. The cleaned, scrubbed flue gas is then conveyed to stack 48 for discharge to the atmosphere. In another embodiment, ESP 44 could be interchangeably replaced with a fabric filter unit.

The fifth equipment configuration in FIG. 1 comprises a first particulate removal device in the form of either a fabric filter or an electrostatic precipitator (ESP) which is schematically indicated at 44. FF/ESP 44 is configured to remove fine particulates from flue gas 28. Downstream of FF/ESP 44 there is provided a spray dryer apparatus (SDA) schematically indicated at 50, also known as a dry scrubber, for removal of sulfur oxides from the flue gas 28. Downstream of SDA 50 there is provided a second particulate collection device (PCD) 44 for removal of any remaining particulates from the flue gas 28. As in the embodiments above, PCD 44 may comprise any suitable particulate collection device including, but not limited to, a fabric filter or an electrostatic precipitator as described above. The cleaned, scrubbed flue gas is then conveyed to stack 48 for discharge to the atmosphere.

In order to further reduce $NO_x$ emissions, some boilers 12 employ staged combustion wherein only part of the stoichiometric amount of air is provided in the main burner zone 24, with the balance of the air for combustion, together with any excess air required due to the fact that no combustion process is 100 percent efficient, is provided above the burner zone 24 via over fire air (OFA) ports 52. If staged combustion is employed in a boiler 12, due to the reduced air supplied to the burner zone 24, a reducing atmosphere is created in the lower portion of the furnace 26, including the hopper region 54.

In accordance with a first embodiment of the present invention, one or more suitable iron-bearing compounds, and if so desired one or more suitable halide compounds, are added to the one or more coal pulverizers 20 prior to supplying the pulverized coal to the one or more burners 22. The system and apparatus for accomplishing this desired result is also shown in FIG. 1, generally designated 100. The system 100 comprises a storage means 120 for temporarily storing the iron-based phosphorus reduction compound, and if so desired the mercury reducing compound, generally designated 110; delivery means 130, 135 for conveying the compound 110 to a desired location, including valves, seals, etc. as required; and control means 150, advantageously microprocessor-based control means, which are accessed via an operator via human operator interface (I/O) station 160, which includes display and data collection and storage means as required. Although not illustrated individually, the system of the present invention can, in one embodiment, utilize independent storage, delivery and control means (in accordance with those described above) for each individual iron and/or halide compound. In still another embodiment, the system of the present invention can comprise one set of storage, delivery and control means for the iron compounds or compounds utilized herein and one set of storage, delivery and control means (in accordance with those described above) for the halide compound or compounds utilized herein.

In FIG. 1, the raw coal 14 to which the iron-based phosphorus reducing compound 110 has been added is referred to as 140. Advantageously, the iron-based phosphorus reducing compound 110 may be provided along with the raw coal 14 via the feeder 18, which permits close control and measurement of the delivery of both raw coal 14 and iron-based phosphorus reducing compound 110 into the coal pulverizer 20. Alternatively, the iron-based phosphorus reducing compound 110 may be provided directly into the coal pulverizer 20 and/or directly into one or more individual burner lines A-F providing the pulverized coal to individual burners 22, with suitable sealing devices against the positive pressure within the coal pulverizer 20 or burner lines A-F. The delivery means may be slurry-based or pneumatic as required by the particulars of the iron-based phosphorus reducing compound 110 and the amount and location of introduction into the flue gas 28. An interconnected arrangement of control or signal lines 170, 180, 190 and 195 interconnect these various devices to provide control signals, iron-based phosphorus reducing compound 110 level signals, and phosphorus level signals in the flue gas 28 (from a sensor 200) to permit the introduction of the iron-based phosphorus reducing compound 110 into the flue gas 28 to be controlled by a human operator, or automatically controlled. However, if a suitable, real-time sensor 200 for measuring levels of gaseous phosphorus in the flue gas 28 is not available, flue gas samples may instead be taken at the location 200 for later laboratory analysis via suitable test methods, which may be inductively coupled plasma-mass spectrometry (ICP-MS). Based upon the laboratory results, a human operator could then use the operator interface 160 to manually input a desired set-point into control means 150 for the amount of iron-based phosphorus reducing compound 110 introduced into the flue gas 28. Provided that subsequent laboratory analyses do not indicate any significant variation in gaseous phosphorus levels in the flue gas 28, there may be no need for real-time, close control of the introduction of iron-based phosphorus reducing compound 110. Instead, the amount of iron-based phosphorus reducing compound 110 introduced into the flue gas 28 may be simply a function of boiler load or coal feed rate values.

In still yet another embodiment, the present invention utilizes iron (II) oxide. In this embodiment, the need for a reduction reaction to occur is eliminated and the addition points for the iron (II) oxide of this embodiment are therefore broader then previous embodiments. In this case, the iron (II) oxide can be added at any suitable point post-combustion and pre-SCR in order to tie up, bind and/or sequester any PO gas present in the flue gas of a boiler, or furnace, prior to arrival at the SCR. In particular, the iron-based phosphorus reduction compound can be supplied at one or more of the locations G through Q shown in FIG. 1. More particularly, the iron-based phosphorus reduction compound can also be provided into the flue gas 28 at one or more of the following locations:

G: into or below the burner zone 24, in one or more of the front, rear or side walls, via means separate from the burners 22;

H: into the furnace 26 at a location above the burner zone 24, in one or more of the front, rear or side walls;

I, J: into the furnace 26 in the vicinity of or via the OFA ports 52 on one or both of the front or rear walls;

K: into the boiler 12 in the pendant convection pass 34;

L: into the boiler 12 in the upper portion 36 of the horizontal convection pass 38;

M, N, O, P: into the boiler 12 in the horizontal convection pass 38; and/or Q: into the boiler 12 in the hopper region below the horizontal convection pass 38.

Given the above, it should be noted that in addition to the introduction of the one or more iron-based phosphorus reduction compounds, the above-mentioned systems, methods and/or control apparatuses and/or technologies can also be utilized to introduce one or more halide compounds in accordance with the present invention as detailed above. Thus, in one embodiment, the present invention is directed to a system whereby both one or more iron-based compounds and one or more halide compounds are supplied in any manner per the various methods and/or systems described herein. In another embodiment, each type of compound, or even each separate compound regardless of type, can be supplied individually. In still another embodiment, any combination of two or more compounds regardless of type (i.e., whether an iron-based compound or a halide compound) can be supplied together so long as the one compound does not react detrimentally with the other compound.

Furthermore, given the above, the reduced iron, or iron (II) oxide, of the present invention is able to remove the gas phase phosphorus in the form of iron-phosphorus alloys upon coming in contact with the over fire air from iron-phosphorus oxide compounds. This significantly reduces the amount and/or concentration of gas phase phosphorus accumulation in an SCR catalyst. Another advantage of the present invention is that through addition of iron a significant portion of any phosphorus present will be iron-bound. Iron-bound phosphorus compounds are less leachable thereby minimizing the transfer of phosphorus to an SCR catalyst. Furthermore, phosphorus associated with and/or bound to an iron compound (e.g., an iron oxide) is more stable than phosphorus that is associated with and/or bound to a calcium compound (e.g., calcium oxide). Given this, the present invention is, in one embodiment, directed to the situation where a majority of the phosphorus present in the combustion and/or flue stream is sequestered in a suitable iron-phosphorus-oxygen-containing compound thereby substantially reducing the amount of calcium/phosphorus/oxygen-containing compounds that are able to react with $SO_x$. This in turn substantially reduces the amount of gaseous phosphorus that is produced in the combustion and/or flue gas stream by restricting the amount of calcium/phosphorus/oxygen-containing compounds that are present in the combustion and/or flue gas stream to react with various $SO_x$ compounds resulting in the unwanted production of gaseous phosphorus compounds, or phosphorus/oxygen compounds, that can lead to the undesired poisoning of an SCR catalyst.

In still another embodiment, the iron-bearing compound and the halide compound of the present invention can be added via separate compounds or can be added via the same compound and can be supplied in any suitable manner, including the manner detailed in the FIG. 1. Suitable iron-bearing compounds include, but are not limited to, powderized, solid, aqueous (be it an aqueous-based suspension or aqueous-based emulsion) and/or water soluble or water insoluble forms of iron-bearing compounds including, but not limited to, metallic iron, one or more iron oxides, iron carbonate, iron (II) acetate (e.g., $Fe(C_2H_3O_2)_2.4H_2O$), iron (II) nitrate (e.g., $Fe(NO_3)_2.6H_2O$), iron (III) nitrate (e.g., $Fe(NO_3)_3.6H_2O$ or $Fe(NO_3)_3.9H_2O$), iron (II) sulfate (e.g., $FeSO_4.H_2O$, $FeSO_4.4H_2O$, $FeSO_4.5H_2O$, or $FeSO_4.7H_2O$), iron (III) sulfate (e.g., $Fe_2(SO_4)_3.9H_2O$), iron (II) bromide (e.g., $FeBr_2$), iron (III) bromide (e.g., $FeBr_3$, $Fe_2Br_6$, or $FeBr_3.6H_2O$), iron (II) chloride (e.g., $FeCl_2$, $FeCl_2.2H_2O$, or $FeCl_2.4H_2O$ $FeBr_2$), iron (III) chloride (e.g., $FeCl_3$, $Fe_2Cl_6$, $FeCl_3.2½H_2O$, or $FeCl_3.6H_2O$), iron (II) iodide (e.g., $FeI_2$ or $FeI_2.4H_2O$), iron (III) iodate (e.g., $Fe(IO_3)_3$), or mixtures of two or more thereof. Although various hydrated forms of iron-bearing compounds are listed here, the present invention is not limited to just the hydrated forms listed above. Rather, if possible, any corresponding anhydrous form of the above listed iron-bearing compounds can also be utilized in conjunction with the present invention. Given this, when an iron-bearing compound is mentioned herein it should be interpreted to encompass both a hydrated form or an anhydrous form regardless of whether or not such a formula is given with "bound water." Suitable halide compounds include, but are not limited to, potassium bromide, potassium chloride, potassium fluoride, potassium iodide, sodium bromide, sodium chloride, sodium fluoride, sodium iodide, calcium bromide, calcium chloride, calcium fluoride, calcium iodide, aluminum bromide, aluminum chloride, aluminum fluoride, aluminum iodide, other metal halides (e.g., bromides, chlorides, fluorides and/or iodides) with the proviso that the metal is not iron, or any mixture of two or more thereof. If an existing skid is used then one or more aqueous reagents can be pumped via positive displacement pumps from a storage tank to the one or more coal feeders where the reagent is sprayed on the coal as the coal passes on a feeder belt upstream of the pulverizers. In this instance, if so utilized the one or more halide compounds are chosen to be soluble in water, or an aqueous-based solvent. Suitable halides soluble halides include, but are not limited to, potassium bromide, potassium chloride, potassium fluoride, potassium iodide, sodium bromide, sodium chloride, sodium fluoride, sodium iodide, calcium bromide, calcium chloride, calcium iodide, aluminum bromide, aluminum chloride, aluminum iodide, or any mixtures of two or more thereof. In still another embodiment, other transition metal halides (e.g., bromides, chlorides, fluorides and/or iodides) that are not iron halides can be utilized so long as such compounds are, in this embodiment, soluble in water, or an aqueous-based solvent.

In one embodiment, the present invention is advantageous in that it is applicable to both existing SCRs (retrofits) and new SCRs. Additionally, the present invention can be applied to plants that utilize biomass as a fuel source. In one embodiment, implementation of the present invention can be accomplished in a cost-effective manner utilizing low cost hardware designed to supply the necessary iron compound to a combustion process. The present invention also does not affect the current design of boilers and SCRs.

In one embodiment, the amount of iron compound, or compounds, utilized in conjunction with the present invention varies depending upon the phosphorus content in the coal to be burned. In one embodiment, the present invention is directed to a method and system whereby a stoichiometric excess one or more iron compounds are supplied to any point prior to an SCR. While not wishing to be bound to any one theory, it has been found that by supplying a stoichiometric excess of iron upstream of an SCR, the catalytic activity and/or catalytic lifespan of an SCR catalyst can be unexpectedly increased. As can be seen from the graph of FIG. 2, the addition of a stoichiometric excess of one or more iron-based compounds not only protects the SCR catalyst from poisoning via various phosphorus compounds but also increases both the catalytic activity and catalytic lifespan over a period of at least about 2,000 operational hours.

Figure 2:
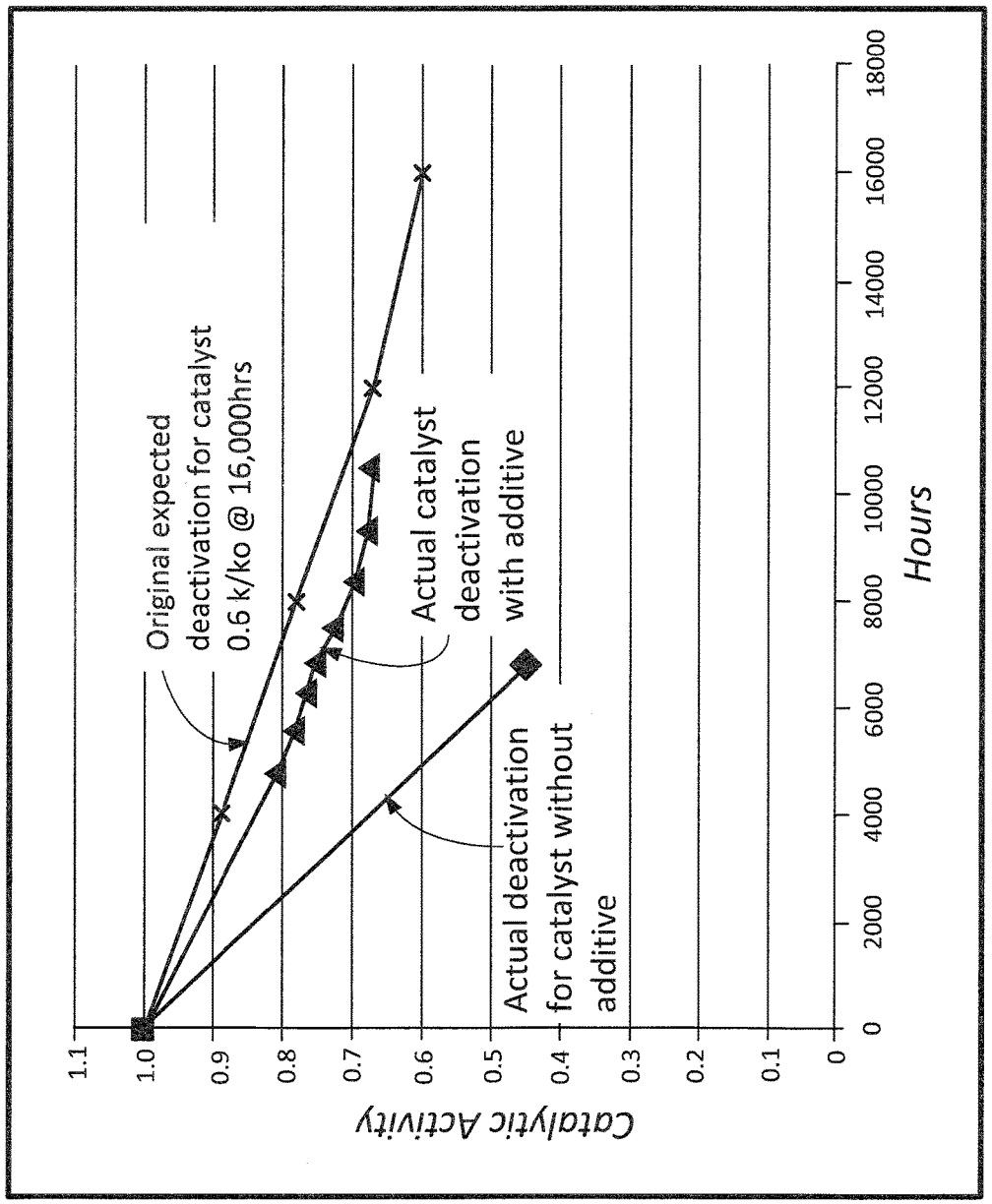
FIG. 2 is a graph illustrating one example of an increase in catalytic activity and/or catalytic lifespan as realized via utilization of a system and method in accordance with one embodiment of the present invention.

Regarding FIG. 2, FIG. 2 is a graph plotting the original expected deactivation for a catalyst without the addition of the iron-bearing compound, or compounds, of the present invention versus the actual deactivation of a catalyst with the addition of an iron-bearing compound of the present invention versus the observed deactivation of a catalyst without the addition of the iron-bearing compound, or compounds, of the present invention. The y-axis of the graph of FIG. 2 is catalytic activity in decimal terms where 0.9 is equivalent to 90 percent activity as measured when compared to unused virgin catalyst as determined using any suitable method for determining catalytic activity known to those of skill in the art. The x-axis of the graph of FIG. 2 is the number of operational hours that the catalyst in question is exposed to the average operational conditions of a 100 MWe coal plant.

Given the above, in one embodiment the present invention achieves either one, or both, of an increase in catalytic activity and/or an increase in catalytic lifespan via the use, introduction and/or delivery of one or more iron-based compounds. In one embodiment, an increase in either one, or both, of catalytic activity and/or catalytic lifespan of at least about 10 percent is achieved at an operational time of at least about 2,000 hours versus the catalytic activity and/or catalytic lifespan of a given catalyst when subjected to similar operational conditions but not subjected to a supply of one or more iron-based compounds as disclosed herein. As would be apparent to those of skill in the art, various known methods are available to measure the baseline catalytic activity as well as the catalytic activity of various catalysts, including SCR catalysts. As such, a detailed discussion herein is omitted for the sake of brevity.

In another embodiment, the present invention achieves an increase in either one, or both, of catalytic activity and/or catalytic lifespan of at least about 10 percent is achieved at an operational time of about 2,000 hours, an increase of at least about 12.5 percent is achieved at an operational time of about 2,000 hours, an increase of at least about 15 percent is achieved at an operational time of about 2,000 hours, an increase of at least about 17.5 percent is achieved at an operational time of about 2,000 hours, an increase of at least about 20 percent is achieved at an operational time of about 2,000 hours, an increase of at least about 22.5 percent is achieved at an operational time of about 2,000 hours, an increase of at least about 25 percent is achieved at an operational time of about 2,000 hours, an increase of at least about 27.5 percent is achieved at an operational time of about 2,000 hours, or even an increase of at least about 30 percent is achieved at an operational time of about 2,000 hours versus the catalytic activity and/or catalytic lifespan of a given catalyst when subjected to similar operational conditions but not subjected to a supply of one or more iron-based compounds as disclosed herein. Here, as well as elsewhere in the specification and claims, individual numerical values can be combined to form additional and/or non-disclosed ranges.

In still another embodiment, the present invention achieves an increase in either one, or both, of catalytic activity and/or catalytic lifespan of at least about 10 percent is achieved at an operational time of about 2,500 hours, an increase of at least about 12.5 percent is achieved at an operational time of about 2,500 hours, an increase of at least about 15 percent is achieved at an operational time of about 2,500 hours, an increase of at least about 17.5 percent is achieved at an operational time of about 2,500 hours, an increase of at least about 20 percent is achieved at an operational time of about 2,500 hours, an increase of at least about 22.5 percent is achieved at an operational time of about 2,500 hours, an increase of at least about 25 percent is achieved at an operational time of about 2,500 hours, an increase of at least about 27.5 percent is achieved at an operational time of about 2,500 hours, or even an increase of at least about 30 percent is achieved at an operational time of about 2,500 hours versus the catalytic activity and/or catalytic lifespan of a given catalyst when subjected to similar operational conditions but not subjected to a supply of one or more iron-based compounds as disclosed herein. Here, as well as elsewhere in the specification and claims, individual numerical values can be combined to form additional and/or non-disclosed ranges.

In still yet another embodiment, the present invention achieves an increase in either one, or both, of catalytic activity and/or catalytic lifespan of at least about 10 percent, at least about 12.5 percent, at least about 15 percent, at least about 17.5 percent, at least about 20 percent, at least about 22.5 percent, at least about 25 percent, at least about 27.5 percent, or even at least about 30 percent is achieved at an operational time of about 3,000 hours versus the catalytic activity and/or catalytic lifespan of a given catalyst when subjected to similar operational conditions but not subjected to a supply of one or more iron-based compounds as disclosed herein. In still yet another embodiment, the present invention achieves an increase in either one, or both, of catalytic activity and/or catalytic lifespan of at least about 10 percent, at least about 12.5 percent, at least about 15 percent, at least about 17.5 percent, at least about 20 percent, at least about 22.5 percent, at least about 25 percent, at least about 27.5 percent, or even at least about 30 percent is achieved at an operational time of about 3,500 hours, about 4,000 hours, about 4,500 hours, about 5,000 hours, about 6,000 hours, about 7,000 hours, about 7,500 hours, about 8,000 hours, about 9,000 hours, about 10,000 hours, about 11,000 hours, about 12,000 hours, about 13,000 hours, about 14,000 hours, about 15,000 hours, or even about 16,000 hours versus the catalytic activity and/or catalytic lifespan of a given catalyst when subjected to similar operational conditions but not subjected to a supply of one or more iron-based compounds as disclosed herein. Here, as well as elsewhere in the specification and claims, individual numerical values can be combined to form additional and/or non-disclosed ranges.

As is known to those of skill in the art, the phosphorus content of coal can be determined by various known methods. Thus, in this instance, the present invention is not limited to any one range of iron compounds that are utilized. Instead, an excess stoichiometric ratio is utilized. In one embodiment, the excess stoichiometric ratio of iron to phosphorus is in the range of about 2.5:1 to about 10:1, or from about 3:1 to about 9:1, or from about 3.5:1 to about 8:1, or from about 4:1 to about 7.5:1, or from about 5:1 to about 7:1, or from about 5.5:1 to about 6.5:1, or even about 6:1. Here, as well as elsewhere in the specification and claims, individual range values can be combined to form additional and/or non-disclosed ranges.

In another embodiment, the amount of iron compound, or compounds, utilized in conjunction with the present invention is within a given range when the coal utilized is Powder River Basin/Lignite coal. In this embodiment, the amount of the iron compound, or compounds, to Powder River Basin/Lignite coal is expressed as the amount of iron compound, or compounds, (hereinafter referred to as just "iron" in only this instance) in pounds for every 1,000 pounds of coal. In one embodiment, the amount of iron compound, or compounds, utilized is in the range of about 5 pounds of "iron" per 1,000 pounds of coal to about 20 pounds of "iron" per 1,000 pounds of coal. In another embodiment, the amount of iron compound, or compounds, utilized is in the range of about 5.5 pounds of "iron" per 1,000 pounds of coal to about 17.5 pounds of "iron" per 1,000 pounds of coal, or from about 6 pounds of "iron" per 1,000 pounds of coal to about 15 pounds of "iron" per 1,000 pounds of coal, or from about 7 pounds of "iron" per 1,000 pounds of coal to about 12.5 pounds of "iron" per 1,000 pounds of coal, or from about 7.5 pounds of "iron" per 1,000 pounds of coal to about 10 pounds of "iron" per 1,000 pounds of coal, or even from about 8 pounds of "iron" per 1,000 pounds of coal to about 9 pounds of "iron" per 1,000 pounds of coal. Here, as well as elsewhere in the specification and claims, individual range values can be combined to form additional and/or non-disclosed ranges.

In another embodiment, where both an iron-based compound and a halide compound as defined above are utilized, the amount of iron-based compound, or compounds, as compared on a weight basis to the amount of one or more halide compounds is in the range of about 95 weight parts iron based compound, or compounds to about 5 weight parts halide compound, or compounds. In another embodiment, the weight ratio of iron-based compound, or compounds, to halide compound, or compounds, is in the range of about 95:5 to about 75:25, or from about 93.5:6.5 to about 80:20, or from about 92:8 to about 82.5:17.5, or from about 91:9 to about 85:15, or even from about 90:10 to about 87.5:12.5. Thus, in one embodiment, the amount of the one or more halide compounds, if so utilized, can be calculated based on any of the above stated iron-based compound, or compounds, amounts via the ratios disclosed in this paragraph. Here, as well as elsewhere in the specification and claims, individual range values can be combined to form additional and/or non-disclosed ranges.

In another embodiment, the injection rate of the one or more halide compounds, if so utilized in conjunction with the present invention, for controlling mercury in a flue gas, or combustion gas, is based on a non-limiting example of a 100 MWe coal power plant. In this case, the injection rate for the one or more halide compounds, if in solution, is in the range of about 0.25 gallons per hour to about 10 gallons per hour, or from about 0.5 gallons per hour to about 5 gallons per hour, or even from about 1 gallon per hour to about 4 gallons per hour. In another embodiment, regardless of power plant or combustion plant size, the one or more halide compounds are supplied at any rate to a flue gas, or combustion gas, sufficient to yield a concentration of halide (e.g., bromide, chloride or iodide) between about 10 ppm to about 200 ppm, or from about 25 ppm to about 175 ppm, or from about 50 ppm to about 150 ppm. It should be noted that depending upon the emissions control technology in place on the device generating the flue gas, or combustion gas, it may be desirable to use a lower halide concentration in order to prevent any type of detrimental effects to such downstream emissions technology. In one embodiment of such an instance the concentration of halide is between about 10 ppm to about 125 ppm, or from about 25 ppm to about 100 ppm, or from about 50 ppm to about 75 ppm. Here, as well as elsewhere in the specification and claims, individual range values (even from different embodiments) can be combined to form additional and/or non-disclosed ranges.

In light of the above, one of skill in the art would recognize that the amount of one or more iron, or iron-based, compounds necessary to supply the desired amount of iron to a flue gas, or combustion gas, in accordance with the process of the present invention will vary depending upon the size of the device generating such flue gas, or combustion gas. The same can be said of the one or more halide compounds. That is, one of skill in the art would recognize that the amount of one or more halide compounds necessary to supply the desired amount of halide to a flue gas, or combustion gas, in accordance with the process of the present invention will vary depending upon the size of the device generating such flue gas, or combustion gas. Thus, the present invention is not limited to any specific rate or range of supply.

In another embodiment, for a 100 MWe coal power plant the amount of halide solution (25 weight percent solution) supplied to the flue gas, or combustion gas, is in the range of about 0.25 gallons per hour to about 6 gallons per hour, or from 0.5 gallons per hour to about 5 gallons per hour, or even from 1 gallon per hour to about 4 gallons per hour. Here, as well as elsewhere in the specification and claims, individual range values can be combined to form additional and/or non-disclosed ranges. However, as is noted above, the present invention is not limited to solely these supply rates. Rather, any supply rate can be used in order to achieve the desired concentration of halide.

As would be apparent to one of skill in the art, other additional factors can impact the amount of iron-based, iron-bearing and/or iron compounds supplied in connection with the various embodiments of the present invention. Such additional factors include, but are not limited to, the amount and/or type of phosphorus present in the coal, or other combustible fuel; the size and/or output of the boiler, heater, kiln, or other flue gas-, or combustion gas-, generating device; and the desired stoichiometric ratio to be achieved; the type and/or manner of combustion, the type and/or arrangement of any applicable equipment or structure.

In another embodiment, the one or more iron compounds and/or the one or more halide compounds utilized in conjunction with the present invention can be of any particle size and/or particle geometry. Suitable particle geometries include, but are not limited to, spherical, platelet-like, irregular, elliptical, oblong, or a combination of two or more different particle geometries. As would be apparent to those of skill in the art, each different compound, or even the same compound, can be supplied in the form of one or more particle geometries. In one embodiment, the one or more iron compounds and/or the one or more halide compounds of the present invention, if water soluble, can be supplied in solution form, either independently or together so long as the active components to be delivered to the flue, or combustion, gas do not adversely react. In such an instance, a solution concentration of at least about 15 weight percent of one or more water soluble iron compounds and/or one or more water soluble halide compounds is utilized. In another embodiment, a solution concentration of at least about 20 weight percent, at least about 25 weight percent, at least about 30 weight percent, at least about 35 weight percent, at least about 40 weight percent, at least about 45 weight percent, or even at least about 50 weight percent of more of the one or more water soluble iron compounds and/or the one or more water soluble halide compounds is utilized in conjunction with the present invention. Here, as well as elsewhere in the specification and claims, individual range values can be combined to form additional and/or non-disclosed ranges. As would be appreciated by those of skill in the art, the solution concentration of any one or more water soluble iron compounds and/or the one or more water soluble halide compounds should not, in one embodiment, exceed the solubility amount, respectively, for the one or more iron compounds and/or the one or more halide compounds.

In still another embodiment, the one or more iron compounds and/or the one or more halide compounds of the present invention can be supplied in a powdered form, a solution form, an aqueous suspension form, or a combination of two or more thereof. In the case of an aqueous suspension, the one or more iron compounds and/or the one or more halide compounds utilized in conjunction with the present invention should have a suitable particle size. Additionally, even absent the desire to place the one or more iron compounds and/or the one or more halide compounds of the present invention into an aqueous solution, the one or more iron compounds and/or the one or more halide compounds should have a suitable particle size that facilitates a higher degree of reactivity when placed into contact with a flue, or combustion, gas. In one embodiment, both of these conditions can be met, whether individually or in combination, by one or more iron compounds and/or one or more halide compounds where at least about 95 percent of the particles have a particle size of less than about 400 μm (microns), where at least about 95 percent of the particles have a particle size of less than about 350 μm (microns), where at least about 95 percent of the particles have a particle size of less than about 300 μm (microns), where at least about 95 percent of the particles have a particle size of less than about 250 μm (microns), where at least about 95 percent of the particles have a particle size of less than about 200 μm (microns), or even where at least about 95 percent of the particles have a particle size of less than about 175 μm (microns). Here, as well as elsewhere in the specification and claims, individual range values can be combined to form additional and/or non-disclosed ranges.

Although not limited hereto, a suitable iron compound for use in conjunction with the present invention is iron (II) carbonate available from Prince Agri Products (a subsidiary of Phibro Animal Health Corporation located in Ridgefield Park, N.J.). This iron (II) carbonate is a powdered compound where at least about 95 percent of its particles are less than 200 μm (microns) in size. Additionally, the concentration of iron (II) carbonate in this product is about 80 percent by weight with substantially all of the remaining 20 weight percent being non-reactive in light of the use here. A suitable halide compound for use, if so desired, in conjunction with the present invention is calcium bromide available from Tetra Chemical (located in The Woodlands, Tex.).

In the instance where one or more aqueous suspensions is/are utilized in conjunction with the present invention, such aqueous suspension(s) can further comprise a suitable amount of one or more anti-settling, suspension, thickening or emulsification agents. Suitable anti-settling, suspension, thickening or emulsification agents include, but are not limited to, sodium polyacrylates, carbomers, acrylates, and inorganic thickening agents. Other suitable anti-settling, suspension, thickening or emulsification agents are known to those of skill in the art and as such a discussion herein is omitted for the sake of brevity. In another embodiment, a suitable suspension or emulsification can be achieved via agitation and does not necessarily require the use of one or more anti-settling, suspension, thickening or emulsification agents. In another embodiment, a combination of one or more anti-settling, suspension, thickening or emulsification agents can be utilized in combination with agitation.

In still another embodiment, the one or more iron compounds and/or the one or more halide compounds of the present invention should independently have a purity of at least about 50 weight percent, at least about 55 weight percent, at least about 60 weight percent, at least about 65 weight percent, at least about 70 weight percent, at least about 75 weight percent, at least about 80 weight percent, at least about 85 weight percent, at least about 90 weight percent, at least about 95 weight percent, or even at least about 99 weight percent or higher. Here, as well as elsewhere in the specification and claims, individual range values can be combined to form additional and/or non-disclosed ranges.

As for the portion of the one or more iron compounds that is not "an iron compound," such impurities should be non-reactive in the environments present in conjunction with the present invention. Alternatively, if reactive, such impurities should either be easily captured, removed and/or sequestered, or should not add significantly to any further contamination of any catalyst downstream. In still another embodiment, the amount of phosphorus-containing compound impurities in any of the one or more iron compounds and/or the one or more halide compounds that are utilized in conjunction with the present invention should independently be less than about 5 weight percent, less than about 2.5 weight percent, less than about 1 weight percent, less than about 0.5 weight percent, less than about 0.25 weight percent, less than about 0.1 weight percent, or even less than about 0.01 weight percent. Here, as well as elsewhere in the specification and claims, individual range values can be combined to form additional and/or non-disclosed ranges. In still yet another embodiment, the amount of phosphorus-containing compound impurities in any of the one or more iron compounds and/or the one or more halide compounds that are utilized in conjunction with the present invention should be zero. That is, in this embodiment the one or more iron compounds and/or the one or more halide compounds that are utilized in conjunction with the present invention should independently be free from any phosphorus-containing compounds.

While not wishing to be bound to any one theory, it is believed that the present invention exploits various preferential reactions between phosphorus compounds, or phosphorus-containing compounds, to sequester various phosphorus compounds, or phosphorus-containing compounds that are detrimental to an increased active, or service, life of an SCR catalyst. Thus, the reactions discussed herein are to be construed as non-limiting in that other additional reactions may be occurring in the combustion and/or flue gas stream.

In another embodiment, the present invention is direct to a system and method for the injection of iron carbonate, another suitable iron compound, or a blend of one or more iron compounds and one or more non-iron-containing halide compounds with coal in the furnace in order to replenish the active catalytic sites on the surface of SCR catalyst with Fe active sites while simultaneously achieving mercury oxidation. In one instance, the injection material is a blend of iron carbonate (about 90 percent by weight) and a non-iron-containing halogen compound (e.g., calcium bromide 10 percent by weight). As is known to those of skill in the art, any iron that is present in coal ash (including but not limited to PRB coal ash) is not catalytically active as it bonds, or is bonded, with various silicates and/or aluminates in the coal combustion process. In PRB coal more than 90 percent of total iron occurs as a bonded mineral meaning that it is mostly trapped in glassy silica and/or alumina compounds during the combustion process thereby making it unavailable for any other chemical reaction. Thus, the present invention, by injecting iron separately, provides "free" iron that, while not wishing to be bound to any one theory, is believed to settle onto and/or be deposited onto the surface of fly ash which makes it available for further chemical reactions.

This blended material that contains "free" iron as defined above can then provide iron for increasing the catalytic activity and/or catalytic lifespan of the $DeNO_x$ catalyst while, if so provided, the halogen portion of the one or more halide compounds of the present invention acts to aid, or achieve, mercury oxidation. While not wishing to be bound to any one theory, is believed that when the fly ash gets deposited on the surface of SCR catalyst the iron on the surface of fly ash or iron deposited on catalyst as a result of the injection process provides sites onto which ammonia and $NO_x$ can react to form $N_2$ and water. As the iron is injected continuously at a low rate of injection, any active iron sites that become depleted are replaced by new iron sites at a reasonable rate thereby allowing for the extension and/or increase of catalytic lifespan and/or catalytic activity when compared to similar untreated catalyst as explained in detail above. The halogen portion of the halide compound, or compounds, oxidizes elemental mercury into its oxidized form and makes it easier for removal by a downstream wet or dry scrubber, or with PAC injection.

While not wishing to be bound to any one example, data to support this invention is supplied from a long-term injection test of iron carbonate at a 100 MWe coal power plant. Before exposure of the catalyst to the combustion flue gas, the catalyst analysis by XRF technique showed negligible iron present both on the surface and in the bulk of catalyst. After approximately 2,000 hours of operation and injection of $FeCO_3$ a catalyst sample is obtained and analyzed by XRF. This sample shows 0.35 percent Fe on the surface and 0.13 percent Fe in bulk. Previously used catalyst (no $FeCO_3$ injection from the same site) had 0.26 percent Fe on surface and 0.06 percent Fe in bulk after 11,000 hours of operation. Baseline testing prior to the injection of iron carbonate indicates that the $SO_3$ concentration is less than 1 ppm in flue gas at the outlet of air heater. After 8,000 plus hours of operation the $SO_3$ concentration is measured at the air heater outlet and is about 2.6 ppm. This proves that iron injection into the furnace is indeed reaching the SCR. The increase in $SO_3$ concentration can be related to the presence of iron on catalyst surface, since Fe is also a good catalyst for conversion of $SO_2$ to $SO_3$.

As noted above, FIG. 2 illustrates catalyst performance with and without iron injection. The upper line plot (the one with the lower case "Xs") is the originally expected catalyst deactivation curve. This catalyst is expected to last for about 16,000 hours of operation. The lower plot (diamonds) illustrates the actual performance for this catalyst. The catalyst actually lasts for only 6,800 hours of operation due to phosphorus deactivation. The middle line (triangles) illustrates the performance of a catalyst subjected to at least the iron compound injection of the present invention. The catalyst in this example is not new when it is installed but is regenerated catalyst with 15 percent lower initial activity than virgin catalyst.

Thus, in one embodiment, the present invention provides additional sites for the $DeNO_x$ reaction by injection of one or more iron-bearing compounds thereby making it possible to significantly improve the life and/or catalytic activity of an SCR catalyst beyond presently accepted, or believed, time spans. When utilized, the one or more halide compounds of the present invention provide a halogen component that permits for increased mercury oxidation and makes possible mercury removal downstream by any suitable technology (e.g., AQCS equipment).

In another embodiment, the present invention seeks to at a minimum control the amount and/or concentration of gas phase selenium and/or the nature of the selenium speciation in at least one of the flue gas or an aqueous environment found in one or more emission control devices (e.g., a WFGD) via the addition of at least one metal compound at any point described herein with regard to the aforementioned iron-bearing compound. In yet another embodiment, the present invention relates to a method and apparatus for controlling, mitigating and/or reducing the amount and/or concentration of selenium contained in and/or emitted by one or more pieces of emission control equipment for boilers, heaters, kilns, or other flue gas-, or combustion gas-, generating devices (e.g., those located at power plants, processing plants, etc.) via the addition of at least one metal compound at any point described herein with regard to the aforementioned iron-bearing compound. In still yet another embodiment, the present invention relates to method and apparatus for controlling the selenium speciation in one, or both, of a gas phase or a aqueous phase by the addition of at least one metal (e.g., an aluminum metal additive, or a transition metal additive such as iron, nickel, zinc, copper or other transition metal) additive upstream of either a wet flue gas desulfurization (WFGD) unit and/or a dry flue gas desulfurization (DFGD) unit (i.e., also known as semi-dry flue gas desulfurization units which include, but are not limited to, spray dry absorbers (SDAs), circulating dry scrubbers (CDSs), etc.). Given this, in FIG. 1 when the "term" SDA is utilized it should be viewed as encompassing all types DFGD units.

In another embodiment, the present invention seeks to at a minimum control the amount and/or concentration of gas phase selenium and/or the nature of the selenium speciation in at least one of an amine-based post combustion $CO_2$ capture processes. In various amine-based post combustion $CO_2$ capture processes the amine utilized therein will start to degrade due to being subjected to $SO_2$, $CO_2$, heat, $O_2$, and other degradation products. Due to the large amine volume, or inventory, needed for a post combustion $CO_2$ capture process, the amine degradation volume is very large and requires the amine to be regenerated to make operation more economical. This is generally done via a thermal reclaimer, which creates a large volume of thermal sludge and/or waste product. It has been observed that the selenium, due to the recirculation process, present in the inlet gas is removed by the process in the thermal sludge of the thermal reclaimer (this will happen for all amines with thermal reclaiming). Due to the nature of the thermal reclamation process, it concentrates the removed products from the circulating solution such as selenium. This makes the thermal sludge a hazardous waste and is an additional problem to be resolved when these processes are commercialized. When selenium is discovered in a waste stream, the post combustion $CO_2$ capture process may be required to shut down until the selenium issue is resolved. By tying up the selenium upstream of the post combustion $CO_2$ capture process via the addition of one or more metal additives of the present invention, this permits allow the continued operation of $CO_2$ capture processes without concern of concentrated selenium-containing wastes.

Suitable metal compounds include water soluble or water insoluble compounds, be they inorganic or organic compounds, of iron, aluminum, nickel, zinc, copper, or mixtures of two or more thereof. Suitable iron-bearing compounds include, but are not limited to, powderized, solid, aqueous (be it an aqueous-based suspension or aqueous-based emulsion) and/or water soluble forms of iron-bearing compounds including, but not limited to, metallic iron, one or more iron oxides, iron carbonate, iron (II) acetate (e.g., $Fe(C_2H_3O_2)_2.4H_2O$), iron (II) nitrate (e.g., $Fe(NO_3)_2.6H_2O$), iron (III) nitrate (e.g., $Fe(NO_3)_3.6H_2O$ or $Fe(NO_3)_3.9H_2O$), iron (II) sulfate (e.g., $FeSO_4.H_2O$, $FeSO_4.4H_2O$, $FeSO_4.5H_2O$ or $FeSO_4.7H_2O$), iron (III) sulfate (e.g., $Fe_2(SO_4)_3.9H_2O$), iron (II) bromide (e.g., $FeBr_2$), iron (III) bromide (e.g., $FeBr_3$, $Fe_2Br_6$ or $FeBr_3.6H_2O$), iron (II) chloride (e.g., $FeCl_2$, $FeCl_2.2H_2O$ or $FeCl_2.4H_2O$ $FeBr_2$), iron (III) chloride (e.g., $FeCl_3$, $Fe_2Cl_6$, $FeCl_3.2½H_2O$ or $FeCl_3.6H_2O$), iron (II) iodide (e.g., $FeI_2$ or $FeI_2.4H_2O$), iron (III) iodate (e.g., $Fe(IO_3)_3$), or mixtures of two or more thereof. Suitable aluminum-bearing compounds include, but are not limited to, powderized, solid, aqueous (be it an aqueous-based suspension or aqueous-based emulsion) and/or water soluble or water insoluble forms of aluminum-bearing compounds including, but not limited to, metallic aluminum, aluminum acetate (e.g., $Al(C_2H_3O_2)_3$), aluminum bromate (e.g., $Al(BrO_3)_3.9H_2O$), aluminum bromide (e.g., $AlBr_3$, $Al_2Br_6$, $AlBr_3.6H_2O$ or $AlBr_3.15H_2O$), aluminum chloride (e.g., $AlCl_3$, $Al_2Cl_6$ or $AlCl_3.6H_2O$), aluminum fluoride (e.g., $AlF_3$, $AlF_3.3½H_2O$ or $AlF_3.H_2O$), aluminum hydroxide (e.g., $Al(OH)_2$), aluminum iodide (e.g., $AlI_3$, $Al_2I_6$ or $AlI_3.6H_2O$), aluminum nitrate (e.g., $Al(NO_3)_3.9H_2O$), aluminum oxide (e.g., $Al_2O_3$, $Al_2O_3.H_2O$ or $Al_2O_3.3H_2O$), aluminum sulfate (e.g., $Al_2(SO_4)_3$ or $Al_2(SO_4)_3.18H_2O$), or mixtures of two or more thereof. Suitable nickel-bearing compounds include, but are not limited to, powderized, solid, aqueous (be it an aqueous-based suspension or aqueous-based emulsion) and/or water soluble or water insoluble forms of nickel-bearing compounds including, but not limited to, metallic nickel, nickel acetate (e.g., $Ni(C_2H_3O_2)_2$ or $Ni(C_2H_3O_2)_2.4H_2O$), nickel bromate (e.g., $Ni(BrO_3)_2.6H_2O$), nickel bromide (e.g., $NiBr_2$ or $NiBr_2.3H_2O$), nickel carbonate or basic nickel carbonate (e.g., $NiCO_3$, $2NiCO_3.3Ni(OH)_2.4H_2O$ or zaratite), nickel chloride (e.g., $NiCl_2$ or $NiCl_2.6H_2O$), nickel fluoride (e.g., $NiF_2$), nickel hydroxide (e.g., $Ni(OH)_2$ or $Ni(OH)_2.XH_2O$), nickel iodate (e.g., $Ni(IO_3)_2$ or $Ni(IO_3)_2.4H_2O$), nickel iodide (e.g., $NiI_2$), nickel nitrate (e.g., $Ni(NO_3)_2.6H_2O$), nickel oxide (e.g., NiO), nickel sulfate (e.g., $NiSO_4$, $NiSO_4.7H_2O$ or $NiSO_4.6H_2O$), or mixtures of two or more thereof.

Suitable copper-bearing compounds include, but are not limited to, powderized, solid, aqueous (be it an aqueous-based suspension or aqueous-based emulsion) and/or water soluble or water insoluble forms of copper-bearing compounds including, but not limited to, metallic copper, copper acetate (e.g., $Cu(C_2H_3O_2)_2.CuO.6H_2O$ or $Cu(C_2H_3O_2)_2.H_2O$), copper bromate (e.g., $Cu(BrO_3)_2.6H_2O$), copper bromide (e.g., CuBr, $Cu_2Br_2$ or $CuBr_2$), copper trioxybromide (e.g., $CuBr_2.3Cu(OH)_2$), copper carbonate or basic copper carbonate (e.g., $Cu_2CO_3$, $CuCO_3.Cu(OH)_2$ or $2CuCO_3.Cu(OH)_2$), copper chloride (e.g., CuCl, $Cu_2Cl_2$, $CuCl_2$ or $CuCl_2.2H_2O$), copper fluoride (e.g., CuF, $Cu_2F_2$, $CuF_2$ or $CuF_2.2H_2O$), copper hydroxide (e.g., $Cu(OH)_2$), copper iodate (e.g., $Cu(IO_3)_2$ or $Cu_3(IO_3)_6.2H_2O$), copper iodide (e.g., CuI or $Cu_2I_2$), copper nitrate (e.g., $Cu(NO_3)_2.H_2O$ or $Cu(NO_3)_2.3H_2O$), copper oxide (e.g., $Cu_2O$, CuO, $CuO_2.H_2O$ or $Cu_4O$), copper sulfate (e.g., $Cu_2SO_4$, $CuSO_4$ or $CuSO_4.5H_2O$), or mixtures of two or more thereof. Suitable zinc-bearing compounds include, but are not limited to, powderized, solid, aqueous (be it an aqueous-based suspension or aqueous-based emulsion) and/or water soluble or water insoluble forms of zinc-bearing compounds including, but not limited to, metallic zinc, zinc acetate (e.g., $Zn(C_2H_3O_2)_2$ or $Zn(C_2H_3O_2)_2.2H_2O$), zinc bromate (e.g., $Zn(BrO_3)_2.6H_2O$), zinc bromide (e.g., $ZnBr_2$), zinc carbonate (e.g., $ZnCO_3$), zinc chloride (e.g., $ZnCl_2$), zinc ferrate (e.g., $ZnFe_2O_4$), zinc fluoride (e.g., $ZnF_2$ or $ZnF_2.4H_2O$), zinc hydroxide (e.g., $Zn(OH)_2$), zinc iodate (e.g., $Zn(IO_3)_2$ or $Zn(IO_3)_2.2H_2O$), zinc iodide (e.g., $ZnI_2$), zinc nitrate (e.g., $Zn(NO_3)_2.3H_2O$ or $Zn(NO_3)_2.6H_2O$), zinc oxide (e.g., ZnO or $ZnO_2.2\frac{1}{2}H_2O$), zinc sulfate (e.g., $ZnSO_4$, $ZnSO_4.6H_2O$ or $ZnSO_4.7H_2O$), or mixtures of two or more thereof.

It should be noted that although various hydrated forms of metal-bearing compounds are listed here, the present invention is not limited to just the hydrated forms listed above. Rather, if possible, any corresponding anhydrous form of the above listed metal-bearing compounds can also be utilized in conjunction with the present invention. Given this, when a metal-bearing compound is mentioned herein it should be interpreted to encompass both a hydrated form or an anhydrous form regardless of whether or not such a formula is given with "bound water."

In still another embodiment, the present invention can entail the use of at least one kaolin-bearing compound to control gas phase sodium and potassium compounds as described in U.S. Pat. No. 8,303,919 the complete disclosure and teachings of which are hereby incorporated herein by reference in their entirety.

Given the above, the present invention is, in one embodiment, directed to a method and/or apparatus that enables one to control either one, or both, of gas phase selenium or aqueous selenium in one or more emission control devices/equipment for boilers, heaters, kilns, or other flue gas-, or combustion gas-, generating devices. While not wishing to be bound to any one theory, it is believed that the addition of the one or more metal-bearing compounds permits the gas phase and/or aqueous phase capture of selenium via modification of the selenium speciation thereby resulting in a selenium compound having a lower solubility in water, or other aqueous solutions, than would otherwise occur without the addition of the one or more metal-bearing compounds of the present invention. As noted above, the present invention is application to both WFGD and DFGD systems and permits the control, mitigation, and/or reduction of selenium in, for example, the effluent of a WFGD, the slurry solution of a WFGD, the particulate matter resulting from a DFGD, etc. While not wishing to be bound to any one theory, in one embodiment the present invention achieves a modification of the selenium speciation in a gas phase and/or a liquid/aqueous phase to an oxidation state and/or selenium compound (e.g., including, but not limited to, an insoluble selenite compound and/or an insoluble selenide compound, etc.) having a low solubility (herein defined as a solubility of less than about 0.1 grams per 100 mL, less than about 0.01 grams per 100 mL, less than about 0.001 grams per 100 mL, less than about 0.0001 grams per 100 mL, less than about $1\times10^{-5}$ grams per 100 mL, or less than about $1\times10^{-6}$ grams per 100 mL in water at SATP); essentially no solubility (herein defined as a solubility of less than about $1\times10^{-7}$ grams per 100 mL, less than about $1\times10^{-8}$ grams per 100 mL, or even less than about $1\times10^{-9}$ grams per 100 mL in water at SATP); or even practically zero solubility in water or an aqueous solution (herein defined as a solubility of less than about $1\times10^{-10}$ grams per 100 mL, or less than about $1\times10^{-11}$ grams per 100 mL, or less than about $1\times10^{-12}$ grams per 100 mL, less than about $1\times10^{-13}$ grams per 100 mL, or less than about $1\times10^{-14}$ grams per 100 mL, or less than about $1\times10^{-15}$ grams per 100 mL, or even less than about $1\times10^{-16}$ grams per 100 mL in water at SATP), results in a lower amount and/or concentration of selenium that is able to be "emitted" and/or "leached" into a surrounding environment (e.g., a river, a lake, groundwater, etc.). As defined herein, SATP is known as "standard ambient temperature and pressure" and is defined herein to be equivalent to a temperature of 298.15 K (i.e., 25° C. or 77° F.) and an absolute pressure of 100 kPa (i.e., 14.504 psi or 0.986 atm). Here, as well as elsewhere in the specification and claims, individual numerical values can be combined to form additional and/or non-disclosed ranges.

In still yet another embodiment, the present invention's selenium control can be accomplished with, or without, one or more of: (i) the control of mercury in the flue gas via mercury oxidation and capture using any suitable mercury control technology discussed herein; (ii) the control of one or more of gas phase sodium and/or gas phase sodium compounds; and/or (iii) the control of one or more of gas phase potassium and/or gas phase potassium compounds. In still yet another embodiment, the present invention utilizes at least one iron-bearing compound to simultaneously control gas phase phosphorus and gas phase and/or aqueous selenium as described above. In this additional embodiment of the present invention the amount of iron-bearing compound that is supplied in any manner and at any position discussed previously can be the same amount discussed above with regard to the control of gas phase phosphorus. In another embodiment, the amount of iron-bearing compound, or other metal-bearing compound, supplied in accordance with this embodiment of the present invention is not limited to any one amount.

In one embodiment, as is known to those of skill in the art upon determining the selenium content of the coal to be combusted via any suitable known method, an excess stoichiometric ratio can be utilized. In one embodiment, the excess stoichiometric ratio of metal (e.g., iron, aluminum, nickel, zinc and/or copper via the one or more metal-bearing compounds) to selenium is in the range of about 2.5:1 to about 10:1, or from about 3:1 to about 9:1, or from about 3.5:1 to about 8:1, or from about 4:1 to about 7.5:1, or from about 5:1 to about 7:1, or from about 5.5:1 to about 6.5:1, or even about 6:1. Here, as well as elsewhere in the specification and claims, individual range values can be combined to form additional and/or non-disclosed ranges. It should be appreciated that in those embodiments of the present invention where an iron-bearing compound is utilized, it may not be necessary to add any additional iron-bearing compound in order to control, reduce, and/or mitigate the amount of undesirable selenium species and/or selenium compounds in a flue gas and/or water/aqueous solution as the amount of excess iron-bearing compound utilized for controlling the aforementioned gas phase phosphorus can, in some embodiments, be sufficient to control the nature of the selenium speciation.

In still another embodiment, the present invention relates to method and/or apparatus that enables, permits and/or achieves a reduction in the halogen levels necessary to affect mercury capture via one or more halogen-based mercury oxidation processes. This embodiment of the present invention can be accomplished alone, or in combination, with any of the other embodiments of the present invention that are discussed above.

As discussed above, in, for example, a coal combustion process the addition of one or more halogens, or halogen-containing compounds, (e.g., calcium bromide, or any other suitable bromine-containing compound) forms gaseous hydrogen halide compounds (e.g., HBr, HCl, HF, and/or HI). Gaseous hydrogen halide compounds including, but not limited to, HBr gas are not very reactive towards mercury and cause both high temperature corrosion under reducing atmosphere in a furnace and low temperature corrosion at an air heater outlet. For example, HBr is converted to Br and $Br_2$ gas by the Deacon reaction shown below:

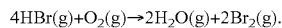

$Br_2$, or another elemental form of a different halogen, in the gas phase then reacts with Hg in the gas phase to produce, for example, mercuric bromide ($HgBr_2$) in the gas phase. Mercuric bromide is the compound in this example that contains the oxidized mercury. This form of mercury is easily removed using flue gas desulfurization (FGD) equipment. Additionally, other coal-based process such as the production of syngas from coal produce undesirable levels of phosphorus compounds thereby resulting in the undesirable deactivation of one or more catalysts associated with such production processes.

In light of the above, it has been unexpectedly discovered that the addition of at least one metal compound to a combustion gas, or flue gas, stream results in a reduction in the halogen levels necessary to affect gas-phase mercury control. In other words, the use of at least one metal-bearing compound according to the present invention has been unexpectedly discovered to catalyze, facilitate, or increase the amount and/or concentration of the one or more halogen-containing compounds (e.g., calcium bromide, etc.) that are converted from their injected compound form through such compound's corresponding hydrogen halide form (e.g., HBr, HCl, HF, and/or HI) to the corresponding molecular halogen form ($Br_2$, $Cl_2$, $F_2$, and/or $I_2$).

In another embodiment the present invention can utilize a combination of one or more metal compounds and one or more halide-containing compounds, with the proviso that the halide containing compound is not a metal halide. Thus, in this embodiment at least one metal compound, or metal-bearing, compound is utilized in conjunction with at least one non-metal halide containing compound. In still another embodiment, the at least one metal, or metal-bearing, compound has a generic formula of AX, where A is equal to a suitable transition metal (e.g., iron, aluminum, nickel, copper, and/or zinc) and X is either an oxide or carbonate ion, anion, group, and/or moiety and the at least one halide-containing compound has a generic formula of BY where B is any atom, element, or cation except for a transition metal and Y is a halide selected from chlorine, bromine, fluorine, or iodine.

As discussed above, in various coal combustion processes the injection of one or more halogen-containing compounds is one method that can be utilized for mercury control via a mercury capture process based on such one or more halogen-containing compounds. However, one drawback to achieving mercury capture and/or reduction via the use of such one or more halogen-containing compounds is the level of the one or more halogen-containing compounds necessary to accomplish a desired reduction level in the mercury concentration in a coal combustion flue gas. The necessary levels of the one or more halogen-containing compounds required to achieve the desired level of mercury capture can lead to the formation of undesirable levels of one or more halogen compounds such as hydrogen halides (e.g., HBr, HCl, HF, and/or HI) in order to have available a suitable concentration of one or more hydrogen halide compounds to be converted via, for example, a corresponding Deacon reaction such as the one above or another reaction that converts hydrogen halides to a corresponding molecular form of a halogen, into one or more corresponding molecular halogens ($Br_2$, $Cl_2$, $F_2$, and/or $I_2$). As is known by those of skill in the art, having a undesirable level of one or more hydrogen halide compounds in combustion, or flue, gas can lead to undesirable corrosion, acid rain (if such acid gases are emitted to the atmosphere), destruction or deactivation of downstream emission control equipment, poisoning or increased wear of one or more downstream catalyst compounds (e.g., one or more SCR catalysts), etc. As noted above, it is such molecular halogen compounds that affect the mercury capture by oxidizing the mercury in the combustion, or flue, gas from elemental mercury ($Hg^0$) to ionic mercury (e.g., $Hg^{2+}$) and then capturing the ionic mercury in a corresponding mercury halide compound (e.g., $HgBr_2$).

As noted above, in one embodiment the present invention through the use of one or more metal, or metal-bearing, compounds achieves a reduction in the amount, level, or concentration of one or more halogen-containing compounds that are injected to affect mercury capture. In one embodiment, the present invention achieves a reduction of about 20 percent by weight or by volume of the amount of one or more halogen-containing compounds necessary to achieve the same level of mercury capture through the use of one or more metal, or metal-bearing, compounds as compared to the amount of one or more halogen-containing compounds necessary without the use of the present invention's one or more metal, or metal-bearing, compounds. It should be noted that in this embodiment the one or more metal, or metal-bearing, compounds can be injected at any of the injection points detailed above. In still another embodiment, the present invention through the use of one or more metal, or metal-bearing, compounds achieves a reduction of at least about 25 percent, at least about 30 percent, at least about 35 percent, at least about 40 percent, at least about 45 percent, at least about 50 percent, at least about 55 percent, or even a reduction of about 60 percent, by weight or by volume, as compared to the amount of one or more halogen-containing compounds necessary without the use of the present invention's one or more metal, or metal-bearing, compounds. Here, as well as elsewhere in the specification and claims, individual numerical values can be combined to form additional and/or non-disclosed ranges.

Given the above, it should be noted that when numerical values are utilized herein with regard to an amount of a reduction that is achieved by one or more embodiments of the present invention, if such numerical values are stated in percentages these numerical values and/or ranges encompass separately both reductions measured in terms of weight and in terms of volume. Additionally, with regard to the terms of "amount" and "concentration," the term "amount" is a broad term that is defined in a non-limiting manner to mean "a quantity of something, typically the total of a thing or things in number, size, value, or extent," while "concentration" is a slightly more specific term that is defined in a non-limiting manner to mean "the amount of a specified substance in a unit amount of another substance." Given these definitions, as used herein the term "amount" encompasses the definition of the term "concentration" for the purposes of the various embodiments of the present invention where a reduction in the amount of something is either discussed and/or claimed.

In another embodiment, the present invention through the use of one or more metal, or metal-bearing, compounds achieves a reduction of between about 20 percent to about 60 percent, between about 25 percent to about 55 percent, between about 30 percent to about 50 percent, or even a reduction of between about 35 percent 45 percent, by weight or by volume, as compared to the amount of one or more halogen-containing compounds necessary without the use of the present invention's one or more metal, or metal-bearing, compounds. Here, as well as elsewhere in the specification and claims, individual numerical values can be combined to form additional and/or non-disclosed ranges.

In one specific instance it was shown that a 50 weight percent reduction in the amount of calcium bromide necessary to achieve a given level of mercury capture in a coal combustion process (e.g., a low sulfur coal such as, but not limited to, Powder River Basin coal) can be achieved by using, or injection, one or more metal, or metal-bearing, compounds according to the present invention as compared to the amount of calcium bromide necessary to achieve the same level of mercury capture without the use, or injection, of one or more metal, or metal-bearing, compounds according to the present invention. Such a reduction in the amount of halogen-containing compound necessary for mercury capture will result not only in a reduction in the cost of mercury emission control but also a reduction in the one or more undesirable downstream effect caused by the presence of an undesirable amount and/or concentration of one or more gaseous hydrogen halide compounds (e.g., HBr, HCl, HF, and/or HI).

Any suitable amount of the one or more metal, or metal-bearing, compounds of the present invention can be utilized in order to achieve the desired reduction in the amount and/or concentration of the one or more halogen-containing compounds necessary for mercury capture. Given this, this embodiment of the present invention is not limited to the injection of any one amount and/or concentration, or range of amounts and/or concentrations, of the one or more metal, or metal-bearing, compounds of the present invention. Rather, the amount and/or concentration of the one or more metal, or metal-bearing, compounds necessary to achieve the desired reduction in the amount and/or concentration of the one or more halogen-containing compounds needed to achieve the desired level of mercury capture will vary based on number of factors known to those of skill in the art. Such factors include, but are not limited to, the mercury level in the fuel (e.g., coal) to be combusted, the amount of fuel being burned in a given time period, the size of the plant burning the fuel (e.g., the generation capacity, the number of burners, etc.), etc. Some non-limiting examples of the amounts and/or concentrations of the one or more metal, or metal-bearing, compounds that are used in conjunction with this embodiment of the present invention are discussed above with regard to other embodiments of the present invention.

In another embodiment, the one or more metal, or metal-bearing, compounds of the present invention can be utilized for the cleanup of syngas produced from fossil fuel gasification, and in particular coal gasification. Syngas contains undesirable amounts, levels, or concentrations of gaseous phosphine ($PH_3$). The phosphine in coal-based syngas is a catalyst poison for the one or more Fischer-Tropsch catalysts which are used in the process of making many useful chemicals from coal-, or biomass-, produced syngas. Given this, the injection, addition, and/or use of one or more metal, or metal-bearing, compounds according to the present invention in a syngas production process will result in a reduction in the amount and/or concentration of phosphorus-containing compounds (e.g., phosphine) present in the resulting syngas. This in turn will result in a reduction in the amount, or level, of poisoning that may result in a Fischer-Tropsch catalyst that is used in conjunction with syngas from coal, biomass and/or natural gas to produce one or more valuable synthetic lubrication oils and/or synthetic fuels.

In one embodiment, the present invention achieves a reduction of about 20 percent by weight or by volume of the amount of one or more gaseous phosphorus compounds in a syngas production process through the use of one or more metal, or metal-bearing, compounds as compared to the amount of one or more gaseous phosphorus compounds present in a syngas production process that does not utilize the present invention's one or more metal, or metal-bearing, compounds. It should be noted that in this embodiment the one or more metal, or metal-bearing, compounds can be injected at any suitable injection point in the syngas process including, but not limited to, the syngas reactor, the syngas cooler, etc. In still another embodiment, the present invention through the use of one or more metal, or metal-bearing, compounds achieves a reduction of at least about 25 percent, at least about 30 percent, at least about 35 percent, at least about 40 percent, at least about 45 percent, at least about 50 percent, at least about 55 percent, at least about 60 percent, at least about 65 percent, at least about 70 percent, at least about 75 percent, or even a reduction of at least about 80 percent, by weight or by volume, as compared to the amount of one or more gaseous phosphorus compounds present in a syngas production process that does not utilize the present invention's one or more metal, or metal-bearing, compounds. Here, as well as elsewhere in the specification and claims, individual numerical values can be combined to form additional and/or non-disclosed ranges.

In another embodiment, the present invention through the use of one or more metal, or metal-bearing, compounds achieves a reduction of between about 20 percent to about 80 percent, between about 25 percent to about 75 percent, between about 30 percent to about 70 percent, between about 35 percent to about 65 percent, between about 40 percent to about 60 percent, or even a reduction of between about 45 percent 55 percent, by weight or by volume, as compared to the amount of one or more gaseous phosphorus compounds present in a syngas production process that does not utilize the present invention's one or more metal, or metal-bearing, compounds. Here, as well as elsewhere in the specification and claims, individual numerical values can be combined to form additional and/or non-disclosed ranges.

In still another embodiment, the present invention is directed to the use of one or more metal, or metal-bearing, compounds in order to achieve a reduction in the concentration, or level, of one or more gaseous acid compounds (e.g., HBr, HCl, HF, HI, $H_3PO_4$, etc.) that are present in a combustion, or flue, gas. As noted above, an undesirable amount, or concentration, of one or more gaseous acid compounds, or gaseous acid precursor compounds, can: (i) result in corrosion damage (e.g., to one or more downstream conduits, pieces of emission control equipment, etc.); (ii) result in the emission of a flue gas that results in the undesirable formation of acid rain due to the amount and/or concentration of the one or more gaseous acid compounds contained therein; (iii) result in the poisoning of any activated carbon material that is injected for mercury control; and/or (iv) result in the poisoning of any one or more downstream catalysts (e.g., a downstream SCR catalyst, etc.)

Given the above, suitable metal, or metal-bearing, compounds for use in the halogen reduction embodiments, the syngas embodiments and/or the acid gas control embodiments of the present invention include water soluble or water insoluble compounds, be they inorganic or organic compounds, of iron, nickel, zinc, copper, or mixtures of two or more thereof. Suitable iron-bearing compounds include, but are not limited to, powderized, solid, aqueous (be it an aqueous-based suspension or aqueous-based emulsion) and/or water soluble forms of iron-bearing compounds including, but not limited to, metallic iron, one or more iron oxides, iron carbonate, iron (II) acetate (e.g., $Fe(C_2H_3O_2)_2.4H_2O$), iron (II) nitrate (e.g., $Fe(NO_3)_2.6H_2O$), iron (III) nitrate (e.g., $Fe(NO_3)_3.6H_2O$ or $Fe(NO_3)_3.9H_2O$), iron (II) sulfate (e.g., $FeSO_4.H_2O$, $FeSO_4.4H_2O$, $FeSO_4.5H_2O$ or $FeSO_4.7H_2O$), iron (III) sulfate (e.g., $Fe_2(SO_4)_3.9H_2O$), iron (II) bromide (e.g., $FeBr_2$), iron (III) bromide (e.g., $FeBr_3$, $Fe_2Br_6$ or $FeBr_3.6H_2O$), iron (II) chloride (e.g., $FeCl_2$, $FeCl_2.2H_2O$ or $FeCl_2.4H_2O$ $FeBr_2$), iron (III) chloride (e.g., $FeCl_3$, $Fe_2Cl_6$, $FeCl_3.2\frac{1}{2}H_2O$ or $FeCl_3.6H_2O$), iron (II) iodide (e.g., $FeI_2$ or $FeI_2.4H_2O$), iron (III) iodate (e.g., $Fe(IO_3)_3$), or mixtures of two or more thereof. Suitable nickel-bearing compounds include, but are not limited to, powderized, solid, aqueous (be it an aqueous-based suspension or aqueous-based emulsion) and/or water soluble or water insoluble forms of nickel-bearing compounds including, but not limited to, metallic nickel, nickel acetate (e.g., $Ni(C_2H_3O_2)_2$ or $Ni(C_2H_3O_2)_2.4H_2O$), nickel bromate (e.g., $Ni(BrO_3)_2.6H_2O$), nickel bromide (e.g., $NiBr_2$ or $NiBr_2.3H_2O$), nickel carbonate or basic nickel carbonate (e.g., $NiCO_3$, $2NiCO_3.3Ni(OH)_2.4H_2O$ or zaratite), nickel chloride (e.g., $NiCl_2$ or $NiCl_2.6H_2O$), nickel fluoride (e.g., $NiF_2$), nickel hydroxide (e.g., $Ni(OH)_2$ or $Ni(OH)_2.XH_2O$), nickel iodate (e.g., $Ni(IO_3)_2$ or $Ni(IO_3)_2.4H_2O$), nickel iodide (e.g., $NiI_2$), nickel nitrate (e.g., $Ni(NO_3)_2.6H_2O$), nickel oxide (e.g., NiO), nickel sulfate (e.g., $NiSO_4$, $NiSO_4.7H_2O$ or $NiSO_4.6H_2O$), or mixtures of two or more thereof.

Suitable copper-bearing compounds include, but are not limited to, powderized, solid, aqueous (be it an aqueous-based suspension or aqueous-based emulsion) and/or water soluble or water insoluble forms of copper-bearing compounds including, but not limited to, metallic copper, copper acetate (e.g., $Cu(C_2H_3O_2)_2.CuO.6H_2O$ or $Cu(C_2H_3O_2)_2.H_2O$), copper bromate (e.g., $Cu(BrO_3)_2.6H_2O$), copper bromide (e.g., CuBr, $Cu_2Br_2$ or $CuBr_2$), copper trioxybromide (e.g., $CuBr_2.3Cu(OH)_2$), copper carbonate or basic copper carbonate (e.g., $Cu_2CO_3$, $CuCO_3.Cu(OH)_2$ or $2CuCO_3.Cu(OH)_2$), copper chloride (e.g., CuCl, $Cu_2Cl_2$, $CuCl_2$ or $CuCl_2.2H_2O$), copper fluoride (e.g., CuF, $Cu_2F_2$, $CuF_2$ or $CuF_2.2H_2O$), copper hydroxide (e.g., $Cu(OH)_2$), copper iodate (e.g., $Cu(IO_3)_2$ or $Cu_3(IO_3)_6.2H_2O$), copper iodide (e.g., CuI or $Cu_2I_2$), copper nitrate (e.g., $Cu(NO_3)_2.H_2O$ or $Cu(NO_3)_2.3H_2O$), copper oxide (e.g., $Cu_2O$, CuO, $CuO_2.H_2O$ or $Cu_4O$), copper sulfate (e.g., $Cu_2SO_4$, $CuSO_4$ or $CuSO_4.5H_2O$), or mixtures of two or more thereof. Suitable zinc-bearing compounds include, but are not limited to, powderized, solid, aqueous (be it an aqueous-based suspension or aqueous-based emulsion) and/or water soluble or water insoluble forms of zinc-bearing compounds including, but not limited to, metallic zinc, zinc acetate (e.g., $Zn(C_2H_3O_2)_2$ or $Zn(C_2H_3O_2)_2.2H_2O$), zinc bromate (e.g., $Zn(BrO_3)_2.6H_2O$), zinc bromide (e.g., $ZnBr_2$), zinc carbonate (e.g., $ZnCO_3$), zinc chloride (e.g., $ZnCl_2$), zinc ferrate (e.g., $ZnFe_2O_4$), zinc fluoride (e.g., $ZnF_2$ or $ZnF_2.4H_2O$), zinc hydroxide (e.g., $Zn(OH)_2$), zinc iodate (e.g., $Zn(IO_3)_2$ or $Zn(IO_3)_2.2H_2O$), zinc iodide (e.g., $ZnI_2$), zinc nitrate (e.g., $Zn(NO_3)_2.3H_2O$ or $Zn(NO_3)_2.6H_2O$), zinc oxide (e.g., ZnO or $ZnO_2.\frac{1}{2}H_2O$), zinc sulfate (e.g., $ZnSO_4$, $ZnSO_4.6H_2O$ or $ZnSO_4.7H_2O$), or mixtures of two or more thereof.

It should be noted that although various hydrated forms of metal-bearing compounds are listed here, the present invention is not limited to just the hydrated forms listed above. Rather, if possible, any corresponding anhydrous form of the above listed metal-bearing compounds can also be utilized in conjunction with the present invention. Given this, when a metal-bearing compound is mentioned herein it should be interpreted to encompass both a hydrated form or an anhydrous form regardless of whether or not such a formula is given with "bound water."

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for simultaneously reducing the amount and/or concentration of one or more halogen-containing compounds used to achieve mercury capture in a flue gas and controlling one or more of gas phase sodium, gas phase sodium compounds, gas phase potassium, and/or gas phase potassium compounds, the method comprising the steps of:
   (a) providing at least one coal-based fuel to the furnace, or boiler;
   (b) subjecting the at least one coal-based fuel to a staged combustion process, wherein the staged combustion process produces gaseous mercury;
   (c) providing one or more halogen-containing compounds to a combustion zone or flue gas stream of a furnace, or boiler, prior to entry of the flue gas into an SCR, wherein the halogen portion of the one or more halogen-containing compounds are liberated in the combustion zone or flue gas stream of the furnace or boiler and are converted to one or more corresponding gaseous hydrogen halide compounds;
   (d) providing one or more metal-bearing compounds to a combustion zone or flue gas stream of a furnace, or boiler, at one or more points selected from injection points A through G that is both prior to entry of the flue gas into an SCR as well as after a point where the majority of the one or more halogen-bearing compounds have been converted to the corresponding gaseous hydrogen halides;

(e) providing one or more kaolin-bearing compounds to a combustion zone or flue gas stream of a furnace, or boiler, at one or more points selected from injection points M, N, O, P or Q that is both prior to entry of the flue gas into an SCR as well as after the point at which the one or more metal-bearing compounds have been provided;

(f) permitting the one or more metal-bearing compounds to catalyze the conversion of the corresponding one or more hydrogen halides to one or more corresponding elemental halogen compounds;

(g) permitting the resulting one or more corresponding elemental halogen compounds to react with the gaseous mercury present in the combustion zone or flue gas stream of the furnace, or boiler, thereby resulting in the oxidation of the gaseous mercury so as to convert the gaseous mercury into one or more corresponding mercury halides, and (h) permitting the one or more kaolin-bearing compounds to react with one or more of gas phase sodium, gas phase sodium compounds, gas phase potassium, and/or gas phase potassium compounds so as to reduce or prevent the poisoning and/or contamination of a catalyst in the SCR.

2. The method of claim 1, wherein the metal-bearing compound is selected from at least one inorganic iron-bearing compound.

3. The method of claim 1, wherein the metal-bearing compound is selected from metallic iron, one or more iron oxides, iron carbonate, iron (II) acetate, iron (II) nitrate, iron (III) nitrate, iron (II) sulfate, iron (III) sulfate, or mixtures of two or more thereof.

4. The method of claim 1, wherein the metal-bearing compound is selected from iron (III) oxide, iron (II) carbonate, iron (II) oxide, iron (II) acetate, or mixtures of two or more thereof.

5. The method of claim 1, wherein the metal-bearing compound is selected from an organic iron-bearing compound.

6. The method of claim 1, wherein the metal-bearing compound is selected from metallic nickel, nickel acetate, nickel bromate, nickel bromide, nickel carbonate, basic nickel carbonate, nickel chloride, nickel fluoride, nickel hydroxide, nickel iodate, nickel iodide, nickel nitrate, nickel oxide, nickel sulfate, or mixtures of two or more thereof.

7. The method of claim 1, wherein the metal-bearing compound is selected from an organic nickel-bearing compound.

8. The method of claim 1, wherein the metal-bearing compound is selected from metallic copper, copper acetate, copper bromate, copper bromide, copper trioxybromide, copper carbonate, basic copper carbonate, copper chloride, copper fluoride, copper hydroxide, copper iodate, copper iodide, copper nitrate, copper oxide, copper sulfate, or mixtures of two or more thereof.

9. The method of claim 1, wherein the metal-bearing compound is selected from an organic copper-bearing compound.

10. The method of claim 1, wherein the metal-bearing compound is selected from metallic zinc, zinc acetate, zinc bromate, zinc bromide, zinc carbonate, zinc chloride, zinc ferrate, zinc fluoride, zinc hydroxide, zinc iodate, zinc iodide, zinc nitrate, zinc oxide, zinc sulfate, or mixtures of two or more thereof.

11. The method of claim 1, wherein the metal-bearing compound is selected from an organic zinc-bearing compound.

12. The method of claim 1, wherein the metal-bearing compound is selected from one or more iron-bearing compounds, one or more nickel-bearing compounds, one or more copper-bearing compounds, one or more zinc-bearing compounds, or mixtures of any two or more thereof.

13. The method of claim 1, wherein the one or more metal-bearing compounds are provided to the combustion zone via addition to pulverized coal.

14. The method of claim 1, wherein the one or more metal-bearing compounds are provided to the combustion zone via a dedicated supply line.

15. The method of claim 1, wherein the amount of the one or more halogen compounds necessary to achieve a desired level of mercury capture is reduced by at least 30 percent due to the implementation of the method of claim 1 when compared to the amount of the one or more halogen compounds necessary to achieve the same desired level of mercury capture without the use of the one or more metal-bearing compounds of the method of claim 1.

16. The method of claim 1, wherein the amount of the one or more halogen compounds necessary to achieve a desired level of mercury capture is reduced by at least 50 percent due to the implementation of the method of claim 1 when compared to the amount of the one or more halogen compounds necessary to achieve the same desired level of mercury capture without the use of the one or more metal-bearing compounds of the method of claim 1.

17. The method of claim 1, wherein the method simultaneously achieves selenium speciation control.

18. The method of claim 1, wherein the one or more halogen-containing compounds are selected from one or more organic, or inorganic, bromine-containing compounds.

19. The method of claim 1, wherein the one or more halogen-containing compounds are selected from one or more inorganic bromine-containing compounds.

20. A method for reducing the amount and/or concentration of one or more halogen-containing compounds used to achieve mercury capture in a flue gas while simultaneously controlling both gas phase selenium speciation and one or more of gas phase sodium, gas phase sodium compounds, gas phase potassium, and/or gas phase potassium compounds, the method comprising the steps of:

(i) providing at least one coal-based fuel to the furnace, or boiler;

(ii) subjecting the at least one coal-based fuel to a staged combustion process, wherein the staged combustion process produces gaseous mercury;

(iii) providing one or more halogen-containing compounds to a combustion zone or flue gas stream of a furnace, or boiler, prior to entry of the flue gas into an SCR, wherein the halogen portion of the one or more halogen-containing compounds are liberated in the combustion zone or flue gas stream of the furnace or boiler and are converted to one or more corresponding gaseous hydrogen halide compounds;

(iv) providing one or more first metal-bearing compounds to a combustion zone or flue gas stream of a furnace, or boiler, at one or more points selected from injection points A through G that is both prior to entry of the flue gas into an SCR as well as after a point where the majority of the one or more halogen-bearing compounds have been converted to the corresponding gaseous hydrogen halides;

(v) providing one or more second metal-bearing compounds to a combustion zone or flue gas stream of a furnace, or boiler, at a point that prior to entry of the flue gas into an SCR;

(vi) providing one or more kaolin-bearing compounds to a combustion zone or flue gas stream of a furnace, or boiler, at one or more points selected from injection points M, N, O, P or Q that is both prior to entry of the flue gas into an SCR as well as after the points at which both the one or more first metal-bearing compounds and the one or more second metal-bearing compounds have been provided;

(vii) permitting the one or more first metal-bearing compounds to catalyze the conversion of the corresponding one or more hydrogen halides to one or more corresponding elemental halogen compounds;

(viii) permitting the resulting one or more corresponding elemental halogen compounds to react with the gaseous mercury present in the combustion zone or flue gas stream of the furnace, or boiler, thereby resulting in the oxidation of the gaseous mercury so as to convert the gaseous mercury into one or more corresponding mercury halides;

(ix) permitting the one or more second metal-bearing compounds to react with one or more gaseous selenium compounds or gaseous selenium-containing compounds thereby resulting in the reduction of any gaseous selenium ions to a lower oxidation state; and (x) permitting the one or more kaolin-bearing compounds to react with one or more of gas phase sodium, gas phase sodium compounds, gas phase potassium, and/or gas phase potassium compounds so as to reduce or prevent the poisoning and/or contamination of a catalyst in the SCR, wherein the metal portion of the one or more first metal-bearing compounds and the metal portion of the one or more second metal-bearing compounds are different metals.

21. The method of claim 20, wherein the one or more first metal-bearing compounds are selected from at least one inorganic iron-bearing compound.

22. The method of claim 20, wherein the one or more first metal-bearing compounds are selected from metallic iron, one or more iron oxides, iron carbonate, iron (II) acetate, iron (II) nitrate, iron (III) nitrate, iron (II) sulfate, iron (III) sulfate, or mixtures of two or more thereof.

23. The method of claim 20, wherein the one or more first metal-bearing compounds are selected from iron (III) oxide, iron (II) carbonate, iron (II) oxide, iron (II) acetate, or mixtures of two or more thereof.

24. The method of claim 20, wherein the one or more first metal-bearing compounds are selected from an organic iron-bearing compound.

25. The method of claim 20, wherein the one or more second metal-bearing compounds are selected from metallic nickel, nickel acetate, nickel bromate, nickel bromide, nickel carbonate, basic nickel carbonate, nickel chloride, nickel fluoride, nickel hydroxide, nickel iodate, nickel iodide, nickel nitrate, nickel oxide, nickel sulfate, or mixtures of two or more thereof.

26. The method of claim 20, wherein the one or more second metal-bearing compounds are selected from an organic nickel-bearing compound.

27. The method of claim 20, wherein the one or more second metal-bearing compounds are selected from metallic copper, copper acetate, copper bromate, copper bromide, copper trioxybromide, copper carbonate, basic copper carbonate, copper chloride, copper fluoride, copper hydroxide, copper iodate, copper iodide, copper nitrate, copper oxide, copper sulfate, or mixtures of two or more thereof.

28. The method of claim 20, wherein the one or more second metal-bearing compounds are selected from an organic copper-bearing compound.

29. The method of claim 20, wherein the one or more second metal-bearing compounds are selected from metallic zinc, zinc acetate, zinc bromate, zinc bromide, zinc carbonate, zinc chloride, zinc ferrate, zinc fluoride, zinc hydroxide, zinc iodate, zinc iodide, zinc nitrate, zinc oxide, zinc sulfate, or mixtures of two or more thereof.

30. The method of claim 20, wherein the one or more second metal-bearing compounds are selected from an organic zinc-bearing compound.

31. The method of claim 20, wherein the one or more second metal-bearing compounds are selected from one or more iron-bearing compounds, one or more nickel-bearing compounds, one or more copper-bearing compounds, one or more zinc-bearing compounds, or mixtures of any two or more thereof.

32. The method of claim 20, wherein the one or more first metal-bearing compounds and the one or more second metal-bearing compound are both provided to the combustion zone via addition to pulverized coal.

33. The method of claim 20, wherein the one or more first metal-bearing compounds and the one or more second metal-bearing compound are both provided to the combustion zone via a dedicated supply line.

34. The method of claim 20, wherein the amount of the one or more halogen compounds necessary to achieve a desired level of mercury capture is reduced by at least 30 percent due to the implementation of the method of claim 20 when compared to the amount of the one or more halogen compounds necessary to achieve the same desired level of mercury capture without the use of the one or more metal-bearing compounds of the method of claim 20.

35. The method of claim 20, wherein the amount of the one or more halogen compounds necessary to achieve a desired level of mercury capture is reduced by at least 50 percent due to the implementation of the method of claim 20 when compared to the amount of the one or more halogen compounds necessary to achieve the same desired level of mercury capture without the use of the one or more metal-bearing compounds of the method of claim 20.

36. The method of claim 20, wherein the one or more halogen-containing compounds are selected from one or more organic, or inorganic, bromine-containing compounds.

37. The method of claim 20, wherein the one or more halogen-containing compounds are selected from one or more inorganic bromine-containing compounds.

* * * * *